US009433827B2

(12) United States Patent
Ricci et al.

(10) Patent No.: US 9,433,827 B2
(45) Date of Patent: *Sep. 6, 2016

(54) GOLF EQUIPMENT FORMED FROM CASTABLE FORMULATION WITH UNCONVENTIONALLY LOW HARDNESS AND INCREASED SHEAR RESISTANCE

(71) Applicant: Acushnet Company, Fairhaven, MA (US)

(72) Inventors: Shawn Ricci, New Bedford, MA (US); Christopher Cavallaro, Lakeville, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/539,321

(22) Filed: Nov. 12, 2014

(65) Prior Publication Data

US 2015/0072807 A1 Mar. 12, 2015

Related U.S. Application Data

(63) Continuation of application No. 13/709,936, filed on Dec. 10, 2012, now Pat. No. 8,907,040, which is a continuation of application No. 13/204,131, filed on Aug. 5, 2011, now Pat. No. 8,329,850, which is a continuation of application No. 12/184,738, filed on Aug. 1, 2008, now Pat. No. 7,994,269.

(60) Provisional application No. 60/935,786, filed on Aug. 30, 2007.

(51) Int. Cl.

| C08G 18/10 | (2006.01) |
|---|---|
| C08G 18/48 | (2006.01) |
| A63B 37/00 | (2006.01) |
| A63B 37/12 | (2006.01) |
| C08G 18/50 | (2006.01) |
| C08G 18/73 | (2006.01) |
| A63B 53/04 | (2015.01) |

(52) U.S. Cl.

CPC ......... *A63B 37/004* (2013.01); *A63B 37/0023* (2013.01); *A63B 37/0024* (2013.01); *A63B 37/0031* (2013.01); *A63B 37/0037* (2013.01); *A63B 37/0049* (2013.01); *A63B 37/0078* (2013.01); *A63B 37/0086* (2013.01); *A63B 37/0096* (2013.01); *C08G 18/10* (2013.01); *C08G 18/4854* (2013.01); *C08G 18/5024* (2013.01); *C08G 18/73* (2013.01); *A63B 53/04* (2013.01); *A63B 53/0487* (2013.01); *A63B 2053/0408* (2013.01); *A63B 2053/0416* (2013.01); *A63B 2209/00* (2013.01)

(58) Field of Classification Search

None
See application file for complete search history.

(56) References Cited

U.S. PATENT DOCUMENTS

| 4,123,061 A | 10/1978 | Dusbiber ............... 273/220 |
|---|---|---|
| 4,560,168 A | 12/1985 | Aoyama ............... 273/232 |
| 4,925,193 A | 5/1990 | Melvin et al. ............... 273/232 |
| 4,956,438 A | 9/1990 | Ruetman et al. ............... 528/60 |
| 4,960,281 A | 10/1990 | Aoyama ............... 273/232 |
| 5,006,297 A | 4/1991 | Brown et al. ............... 264/234 |
| 5,071,578 A | 12/1991 | Ohkubo et al. ............ 252/62.54 |
| 5,249,804 A | 10/1993 | Sanchez ............... 273/232 |
| 5,334,673 A | 8/1994 | Wu ............... 273/235 R |
| 5,403,453 A | 4/1995 | Roth et al. ............... 204/164 |
| 5,456,972 A | 10/1995 | Roth et al. ............... 428/224 |
| 5,484,870 A | 1/1996 | Wu ............... 528/28 |
| 5,562,552 A | 10/1996 | Thurman ............... 473/379 |
| 5,575,477 A | 11/1996 | Hwang ............... 473/379 |
| 5,661,207 A | 8/1997 | Carlson et al. ............... 524/414 |
| 5,688,191 A | 11/1997 | Cavallaro et al. ............ 473/373 |
| 5,692,974 A | 12/1997 | Wu et al. ............... 473/377 |
| 5,713,801 A | 2/1998 | Aoyama ............... 473/354 |
| 5,733,428 A | 3/1998 | Calabria et al. ............... 264/134 |
| 5,803,831 A | 9/1998 | Sullivan et al. ............... 473/374 |
| 5,820,488 A | 10/1998 | Sullivan et al. ............... 473/374 |
| 5,849,168 A | 12/1998 | Lutz ............... 264/755 |
| 5,885,172 A | 3/1999 | Hebert et al. ............... 473/354 |
| 5,908,358 A | 6/1999 | Wu ............... 473/378 |
| 5,919,100 A | 7/1999 | Boehm et al. ............... 473/354 |
| 5,957,787 A | 9/1999 | Hwang ............... 473/379 |
| 5,965,669 A | 10/1999 | Cavallaro et al. ............ 525/221 |
| 5,981,654 A | 11/1999 | Rajagopalan ............... 525/66 |
| 5,981,658 A | 11/1999 | Rajagopalan et al. .......... 525/72 |
| 6,056,842 A | 5/2000 | Dalton et al. ............... 156/243 |
| 6,099,415 A | 8/2000 | Lutz ............... 473/357 |
| 6,129,881 A | 10/2000 | Puniello ............... 264/278 |
| 6,149,535 A | 11/2000 | Bissonnette et al. .......... 473/354 |
| 6,207,784 B1 | 3/2001 | Rajagopalan ............... 528/71 |
| 6,213,898 B1 | 4/2001 | Ogg ............... 473/383 |
| 6,235,230 B1 | 5/2001 | Puniello ............... 264/278 |
| 6,241,622 B1 | 6/2001 | Gobush et al. ............... 473/199 |
| 6,248,804 B1 | 6/2001 | Lutz ............... 523/160 |
| 6,286,364 B1 | 9/2001 | Aoyama et al. ............ 73/65.03 |

(Continued)

OTHER PUBLICATIONS

U.S. Appl. No. 09/442,845, filed Nov. 18, 1999 entitled "Mold for a Golf Ball".

(Continued)

*Primary Examiner* — David Buttner

(74) *Attorney, Agent, or Firm* — Smith, Gambrell & Russell, LLP

(57) ABSTRACT

Golf equipment including compositions including castable formulations that have low material hardness and increased shear resistance. The compositions may be used in any layer of a golf ball including cores, intermediate layers, and covers and result in high spin rates.

20 Claims, 2 Drawing Sheets

(56) References Cited

U.S. PATENT DOCUMENTS

| | | | |
|---|---|---|---|
| 6,290,615 B1 | 9/2001 | Ogg | 473/378 |
| 6,315,915 B1 | 11/2001 | Hebert et al. | 216/67 |
| 6,338,684 B1 | 1/2002 | Winfield et al. | 473/378 |
| 6,358,161 B1 | 3/2002 | Aoyama | 473/383 |
| 6,379,138 B1 | 4/2002 | Puniello et al. | 425/116 |
| 6,383,092 B1 | 5/2002 | Ogg | 473/378 |
| 6,386,992 B1 | 5/2002 | Harris et al. | 473/371 |
| 6,409,615 B1 | 6/2002 | McGuire et al. | 473/383 |
| 6,476,130 B1 | 11/2002 | Rajagopalan et al. | 525/74 |
| 6,486,261 B1 | 11/2002 | Wu et al. | 525/332.6 |
| 6,488,591 B1 | 12/2002 | Gobush et al. | 473/199 |
| 6,500,073 B1 | 12/2002 | Gobush et al. | 473/199 |
| 6,500,495 B2 | 12/2002 | Lutz | 427/500 |
| 6,503,156 B1 | 1/2003 | Sullivan | 473/374 |
| 6,506,130 B2 | 1/2003 | Sullivan | 473/374 |
| 6,548,618 B2 | 4/2003 | Sullivan et al. | 528/76 |
| 6,565,455 B2 | 5/2003 | Hayashi et al. | 473/371 |
| 6,565,456 B2 | 5/2003 | Hayashi et al. | 473/373 |
| 6,610,812 B1 | 8/2003 | Wu et al. | 528/60 |
| 6,617,378 B2 | 9/2003 | Ohira et al. | 524/100 |
| 6,645,091 B2 | 11/2003 | Wu et al. | 473/377 |
| 6,705,959 B2 | 3/2004 | Morgan et al. | 473/383 |
| 6,790,925 B2 | 9/2004 | Danielmeier et al. | 528/68 |
| 6,796,912 B2 | 9/2004 | Dalton et al. | 473/383 |
| 6,800,690 B2 | 10/2004 | Rajagopalan et al. | 525/183 |
| 6,812,317 B2 | 11/2004 | Dalton et al. | 528/61 |
| 6,824,476 B2 | 11/2004 | Sullivan et al. | 473/374 |
| 6,877,974 B2 | 4/2005 | Puniello et al. | 425/116 |
| 6,998,445 B2 | 2/2006 | Ladd et al. | 525/261 |
| 7,041,769 B2 | 5/2006 | Wu et al. | 528/61 |
| 7,090,798 B2 | 8/2006 | Hebert et al. | 264/255 |
| 7,105,628 B2 | 9/2006 | Kuntimaddi et al. | 528/326 |
| 7,259,222 B2 | 8/2007 | Wu et al. | 528/64 |
| 7,378,483 B2 | 5/2008 | Wu et al. | 528/64 |
| 7,427,243 B2 | 9/2008 | Sullivan | 473/378 |
| 7,994,269 B2 | 8/2011 | Ricci et al. | 528/65 |
| 8,329,850 B2 | 12/2012 | Ricci et al. | 528/66 |
| 8,907,040 B2 * | 12/2014 | Ricci | A63B 37/0023 473/374 |
| 2002/0006837 A1 | 1/2002 | Dalton et al. | 473/361 |
| 2003/0212240 A1 * | 11/2003 | Wu | A63B 37/0003 528/76 |
| 2003/0232666 A1 | 12/2003 | Sullivan | 473/378 |

OTHER PUBLICATIONS

Non-Final Office Action dated Dec. 23, 2013 of corresponding U.S. Appl. No. 13/709,936.
Final Office Action dated May 30, 2014 of corresponding U.S. Appl. No. 13/709,936.
Notice of Allowance dated Aug. 7, 2014 of corresponding U.S. Appl. No. 13/709,936.
Non-Final Office Action dated Apr. 19, 2012 of corresponding U.S. Appl. No. 13/204,131.
Non-Final Office Action dated Dec. 29, 2010 of corresponding U.S. Appl. No. 12/184,738.

* cited by examiner

GOLF EQUIPMENT FORMED FROM CASTABLE FORMULATION WITH UNCONVENTIONALLY LOW HARDNESS AND INCREASED SHEAR RESISTANCE

CROSS-REFERENCE TO RELATED APPLICATIONS

This application is a continuation application of U.S. patent application Ser. No. 13/709,936, filed Dec. 10, 2012, now U.S. Pat. No. 8,907,040, which is a continuation application of U.S. patent application Ser. No. 13/204,131, filed Aug. 5, 2011, now U.S. Pat. No. 8,329,850, which is a continuation application of U.S. patent application Ser. No. 12/184,738, filed Aug. 1, 2008, now U.S. Pat. No. 7,994,269, which claims priority to provisional application No. 60/935,786, filed on Aug. 30, 2007, the entire disclosures of which are incorporated by reference herein.

FIELD OF THE INVENTION

The invention relates to a castable composition that exhibits low hardness, improved shear resistance, and desirable processing conditions. The castable composition may be useful in golf equipment, such as golf ball components and golf club components. In particular, the present invention is directed to castable polyurethane and polyurea compositions that have material hardnesses below about 30 Shore D, shear resistance that is equal or better to materials with hardnesses greater than 30 Shore D, and significant increases in spin rates compared to materials with hardnesses greater than 30 Shore D.

BACKGROUND OF THE INVENTION

Golf balls are formed from a variety of compositions, which provides a golf ball manufacturer the ability to alter feel and aerodynamic characteristics of a particular ball. For example, golf ball covers formed from balata allow a highly skilled golfer to achieve spin rates sufficient to more precisely control ball direction and distance, particularly on shorter shots. Balata covered golf balls are easily damaged, however, which discourages the average golfer from using such balls. To remedy this durability issue, manufacturers typically use ionomer resin as a cover material. However, while ionomer resin covered golf balls possess virtually cut-proof covers, the spin and feel are inferior compared to balata covered balls.

Polyurethanes and polyureas have also been recognized as useful materials for golf ball covers since the resulting golf balls are durable like ionomer resin, but have the softer feel of a balata covered golf ball. U.S. Pat. No. 4,123,061 teaches a golf ball made from a polyurethane prepolymer formed of polyether with diisocyanate that is cured with either a polyol or an amine-type curing agent. In addition, U.S. Pat. No. 5,334,673 discloses the use of two categories of polyurethane available on the market, i.e., thermoset and thermoplastic polyurethanes, for forming golf ball covers and, in particular, thermoset polyurethane covered golf balls made from a composition of polyurethane prepolymer and a slow-reacting amine curing agent, and/or a difunctional glycol. U.S. Pat. No. 5,484,870 discloses a polyurea composition comprising the reaction product of an organic diisocyanate and an organic amine, each having at least two functional groups. Once these two ingredients are combined, the reaction rate is very fast and, thus, the ability to vary the physical properties of the composition is limited.

Despite the favorable characteristics of polyurethane and polyurea materials for use in golf balls, ball components formed of these materials do not fully match ionomer resin golf ball components with respect to resilience or the rebound (a function of the initial velocity of a golf ball after impact with a golf club). In addition, in order to achieve even adequate resilience and shear resistance, manufacturers are generally limited to material hardness ranges of 30 Shore D or greater. Moreover, manufacturing in the lower range of this hardness results in a high degree of non-concentric ball components due to viscosity issues. Furthermore, while the spin rates of polyurethane and polyurea covered golf balls are higher than ionomer covered balls, achieving an even high spin rate would provide more control.

Therefore, there remains a continuing need for golf equipment and, in particular, golf balls having components formed from materials that provide the desired soft feel and, thus, higher spin, but still have at least comparable resilience to that of ionomer resins without adversely affecting overall performance characteristics of the golf balls.

SUMMARY OF THE INVENTION

A golf ball including a core and a cover, wherein the cover is formed from a composition having a material hardness of about 8 Shore D to about 14 Shore D including: a prepolymer having about 5 to about 7 percent NCO groups, wherein the prepolymer is formed from the reaction product of an isocyanate-containing component and an isocyanate-reactive component; and a curing agent including polyether diol, wherein the cover has a hardness of about 30 Shore D to about 60 Shore D, and wherein the golf ball has a coefficient of restitution of about 0.800 or greater.

In one embodiment, the polyether diol has a molecular weight of about 400 to about 2500. In another embodiment, the polyether diol has the structure:

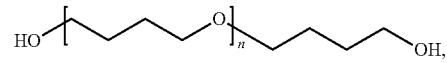

wherein n is the chain length from 2 to 30.

In this aspect of the invention, the golf ball may have at least one of a driver spin rate of about 4000 rpm or greater, an 8-iron spin rate of about 10,000 rpm or greater, or a half-wedge spin rate of about 7,000 or greater. In one embodiment, the driver spin rate is about 5000 rpm or greater. In another embodiment, the driver spin rate is about 5200 rpm or greater.

The present invention is also directed to a golf ball including: a core; a layer disposed about the core to create an inner ball; and a cover having a hardness of about 40 Shore D to about 55 Shore D cast onto the inner ball, wherein the cover is formed from a composition having a material hardness of about 8 Shore D to about 12 Shore D including: a prepolymer formed from the reaction product of at least one isocyanate-containing component and at least one hydroxy-terminated isocyanate-reactive component, wherein the prepolymer has NCO content of about 5 percent to about 7 percent; and at least one curing agent.

The curing agent may include a polyether diol having a molecular weight of about 400 to about 2500. The composition may have a ratio of prepolymer to curing agent of about 1:0.95. The golf ball may have a spin rate of about 5,000 rpm or greater when struck with a driver. In one embodiment, the material hardness is about 10 Shore D to about 12 Shore D. In another embodiment, the prepolymer has an NCO content of about 6 percent to about 6.5 percent. In yet another embodiment, the hydroxy-terminated isocyanate-reactive component includes polytetramethylene ether glycol.

The present invention also relates to a golf ball including: a core; and a cover having a hardness of about 40 Shore D to about 55 Shore D, wherein the cover is formed of a castable material including: a prepolymer formed from at least one isocyanate and at least one polyol, wherein the NCO content is about 5 percent to about 7 percent; and a polyether diol having a molecular weight of about 400 to about 800, wherein the castable material has a hardness of about 8 Shore D to about 16 Shore D, wherein the golf ball has a spin rate of about 4,000 rpm or greater when struck with a driver and a COR of about 0.800 or greater at 125 ft/s.

In one embodiment, the COR of the golf ball is about 0.810 or greater. In another embodiment, the golf ball has a spin rate of 5,000 rpm or greater when struck with a driver. In still another embodiment, the prepolymer includes a reaction product of diphenylmethane diisocyanate and polytetramethylene ether glycol. In yet another embodiment, polyether diol has the following structure:

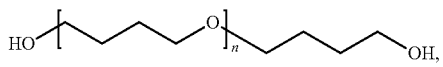

wherein n is the chain length from 2 to 30.

BRIEF DESCRIPTION OF THE DRAWINGS

Further features and advantages of the invention can be ascertained from the following detailed description that is provided in connection with the drawing(s) described below.

DETAILED DESCRIPTION OF THE INVENTION

Figure 1:
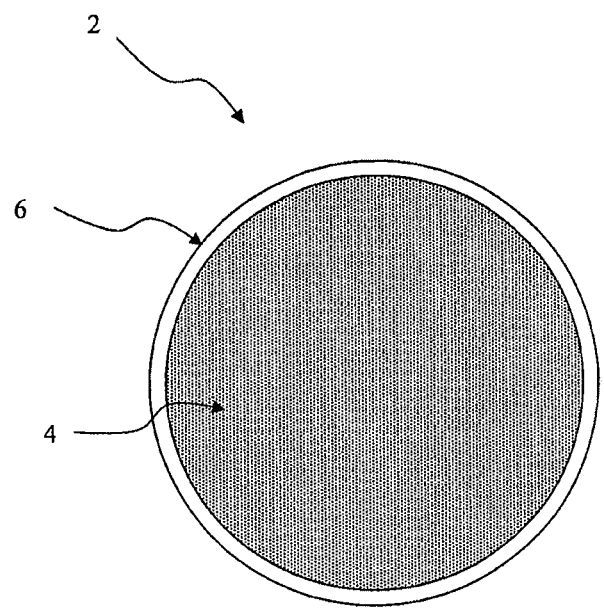
FIG. 1 is a cross-sectional view of a multi-component golf ball, wherein at least one layer is formed from a composition of the invention.

The present invention contemplates improved polyurethane-based and polyurea-based compositions for use in golf equipment, such as golf balls, golf clubs, or the like, that have material hardness values about 30 Shore D or less, exceptional resiliency and shear resistance, and increased spin rate. In particular, because of the softness of the material, the compositions of the invention, when used in golf ball components, produce golf balls having high spin and at least comparable coefficient of restitution values when compared to golf balls formed with higher hardness materials.

The compositions of the invention are castable formulations including an isocyanate-containing component, an isocyanate-reactive component, and a curing agent. The resultant composition preferably has a material hardness of about 30 Shore D or less, more preferably less than about 30 Shore D, and even more preferably about 20 Shore D or less. In addition, the coefficient of restitution of golf balls formed with at least one component including the composition of the invention is about 0.800 or greater, preferably about 0.810 or greater. Moreover, the hardness of the component formed with the composition of the invention, e.g., a golf ball cover, is about 30 to about Shore D, preferably about 30 Shore D to about 50 Shore D, and more preferably about 35 Shore D to about 45 Shore D.

The compositions of the invention may be used in a variety of golf ball constructions, i.e., one-piece, two-piece, or multilayer balls, as well as golf club components, e.g., club head and putter inserts. The compositions of the invention, when included into various golf ball components, e.g., covers, produce golf balls with physical and aerodynamic properties better than or equal to golf balls incorporating conventional polyurethane or polyurea compositions that traditionally have much higher material and ball hardness values.

COMPOSITIONS OF THE INVENTION

The compositions of the invention may include an isocyanate-containing component and at least one isocyanate-reactive component. In one embodiment, the compositions of the invention are polyurethane-based, i.e., compositions formed with an isocyanate-containing component, at least one hydroxy-terminated isocyanate-reactive component, and at least one curing agent. As used herein, the terms "formed from" and "formed of" denote open, e.g., "comprising," claim language. As such, it is intended that a composition "formed from" or "formed of" a list of recited components be a composition comprising at least these recited components, and can further comprise other non-recited components during formulation of the composition. The at least one curing agent may be amine-terminated or hydroxy-terminated.

In this aspect of the invention, the composition of the invention may be formed from a prepolymer and a curing agent. For example, the prepolymer, which is formed from the reaction product of an isocyanate-containing component and an isocyanate-reactive component, is crosslinked with an curing agent. The curing agent reacts with any excess isocyanate and, as such, may be amine-terminated or hydroxy-terminated. In one embodiment, the prepolymer is cured with at least one hydroxy-terminated component. In another embodiment, the prepolymer is cured with an amine-terminated component, which may be based on a primary amine, a secondary amine, a tertiary amine, or a combination thereof. For example, if amine-terminated, the curing agent may include secondary amine groups.

The compositions of the invention may contain urethane and/or urea linkages. As known to those of ordinary skill in the art, a composition formed from an isocyanate-containing component and a hydroxy-terminated component consists essentially of urethane linkages whereas a composition that is formed from an isocyanate-containing component and an amine-terminated isocyanate-reactive component consists essentially of urea linkages. In addition, compositions formed from isocyanate-containing components and a mixture of amine-terminated and hydroxy-terminated components contain both urea and urethane linkages. For example, a prepolymer formed from an isocyanate-containing component and a hydroxy-terminated isocyanate-reactive component may be cured with an amine-terminated curing agent to form a hybrid polyurethane/urea composition containing both urethane and urea linkages. Alternatively, a prepolymer formed from an isocyanate-containing component and an amine-terminated isocyanate-reactive component may be cured with a hydroxy-terminated component to form a hybrid polyurea/urethane composition.

In this regard, in one embodiment of the invention, the compositions of the invention include urethane linkages, i.e.,

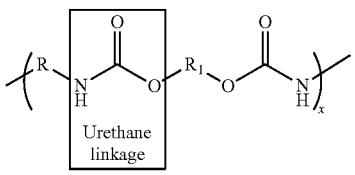

where x is the chain length, i.e., about 1 or greater, and R and $R_1$ are any alkyl group having from about 1 to about 20 carbon atoms, preferably about 1 to about 12 carbon atoms, a phenyl group, a cyclic group, or mixture thereof. In one embodiment, at least one of R and $R_1$ are straight chain or branched hydrocarbon chains having about 1 to about 20 carbons. In another embodiment, both R and $R_1$ are straight chain or branched hydrocarbon chains having about 1 to about 20 carbons. For the purposes of this disclosure, the subscript letters such as m, n, x, y, and z used herein within the generic structures are understood by one of ordinary skill in the art as the degree of polymerization (i.e., the number of consecutively repeating units). In the case of molecularly uniformed products, these numbers are commonly integers, if not zero. In the case of molecularly non-uniformed products, these numbers are averaged numbers not limited to integers, if not zero, and are understood to be the average degree of polymerization.

In another embodiment, the compositions of the invention consist essentially of urea linkages, i.e.,

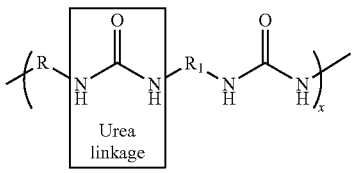

where x is the chain length, i.e., about 1 or greater, and R and $R_1$ are any alkyl group having from about 1 to about 20 carbon atoms, preferably about 1 to about 12 carbon atoms, a phenyl group, a cyclic group, or mixture thereof. In one embodiment, at least one of R and $R_1$ are straight chain or branched hydrocarbon chains having about 1 to about 20 carbons. In another embodiment, both R and $R_1$ are straight chain or branched hydrocarbon chains having about 1 to about 20 carbons. This aspect of the invention may be achieved by forming a composition based on an isocyanate-containing component and at least one amine-terminated isocyanate-reactive component.

The particular components of the compositions of the invention will be discussed in greater detail below.

Isocyanate-Containing Component

Any isocyanate available to one of ordinary skill in the art is suitable for use as the isocyanate-containing component according to the invention. Isocyanates for use with the present invention include aliphatic, cycloaliphatic, aromatic-aliphatic, aromatic, any derivatives thereof, and combinations of these compounds having two or more isocyanate (NCO) groups per molecule. The isocyanates may be organic polyisocyanate-terminated prepolymers, low free isocyanate prepolymer, and mixtures thereof. The isocyanate-containing component may also include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more. In one embodiment, the isocyanate functionality is about two to about three. For example, the isocyanate functionality may range from about 2.1 to about 3.1. In another embodiment, the isocyanate functionality is 3.1 or, in other words, the isocyanate is trifunctional.

Suitable isocyanate-containing components include diisocyanates having the generic structure: O=C=N—R—N=C=O, where R is preferably a cyclic, aromatic, or linear or branched hydrocarbon moiety containing from about 1 to about 20 carbon atoms. The isocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4''-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

While the list above includes unsaturated diisocyanates, i.e., aromatic compounds such as substituted and isomeric mixtures including 2,2'-, 2,4'-, and 4,4'-diphenylmethane diisocyanate (MDI), 3,3'-dimethyl-4,4'-biphenyl diisocyanate (TODI), toluene diisocyanate (TDI), polymeric MDI, carbodimide-modified liquid 4,4'-diphenylmethane diisocyanate, para-phenylene diisocyanate (PPDI), meta-phenylene diisocyanate (MPDI), triphenylmethane-4,4'-, and triphenylmethane-4,4"-triisocyanate, napthylene-1,5,-diisocyanate, 2,4'-, 4,4'-, and 2,2'-biphenyl diisocyanate, polyphenylene polymethylene polyisocyanate (PMDI) (also known as polymeric PMDI), and mixtures thereof, that may be used with the present invention, the use of unsaturated compounds is preferably coupled with the use of a light stabilizer or pigment as discussed below.

In one embodiment, saturated or aliphatic isocyanates, i.e., those isocyanate-containing components lacking carbon-carbon double bonds, are used to form the composition of the invention. Suitable saturated isocyanates include, but are not limited to, ethylene diisocyanate; propylene-1,2-diisocyanate; tetramethylene diisocyanate; tetramethylene-1,4-diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl)dicyclohexane; 2,4'-bis(isocyanatomethyl)dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; and mixtures thereof.

In particular, the isocyanate-containing component of the invention may be an aromatic polyisocyanate based on diphenylmethane diisocyanate (MDI) with an NCO content of about 32 percent or less. In one embodiment, the NCO content of the isocyanate-containing component is about 25 percent or less. In another embodiment, the NCO content of the isocyanate-containing component is about 18 percent or less. In yet another embodiment, the NCO content of the isocyanate-containing component is about 7 percent to about 32 percent. Thus, in one embodiment, the isocyanate-containing component may have about 32 percent or less NCO and includes the following general structure:

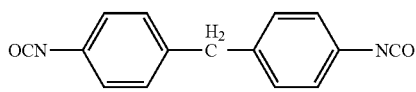

Commercially available examples of such components include, but are not limited to the Desmodur® line of aromatic isocyanates, available from Bayer MaterialScience LLP of Pittsburgh, Pa., such as Desmodur® E 23 A, E 28, E 210, E 743, E 744, VL, XO 672, XP 2619, and XP 7144, which have NCO contents ranging from 7.5 to 31.5.

As discussed briefly above, aromatic-aliphatic isocyanates may also be used in the compositions of the invention. As used herein, aromatic-aliphatic compounds should be understood as those containing an aromatic ring, wherein the isocyanate group is not directly bonded to the ring. As such, without being bound to any particular theory, the remoteness of the NCO groups to the aromatic ring inhibits or slow down the discoloration of the material that is typically associated with aromatic compounds. One example of an aromatic-aliphatic compound is 1,3-bis-isocyanato-1-methylene ethylene benzene (TMXDI), which has the following general structure:

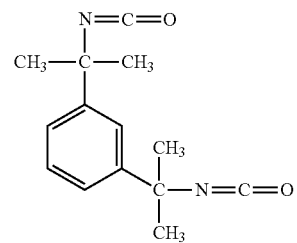

Both meta-tetramethylxylene diisocyanate (m-TMXDI); para-tetramethylxylene diisocyanate (p-TMXDI) are contemplated for use with the present invention as suitable aromatic-aliphatic isocyanates. Further non-limiting examples of aromatic-aliphatic isocyanates include 1,2-, 1,3-, and 1,4-xylene diisocyanate; trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof; dimerized uretdione of any polyisocyanate, such as uretdione of toluene diisocyanate, uretdione of hexamethylene diisocyanate, and mixtures thereof; a modified polyisocyanate derived from the above isocyanates and polyisocyanates; and mixtures thereof. The aromatic aliphatic isocyanates may be mixed with any of the unsaturated or saturated isocyanates listed above for the purposes of this invention.

Isocyanate-Reactive Component

The isocyanate-reactive component of the invention may be any component that reacts with the isocyanate-containing component and reduces or eliminates the free isocyanate groups. For example, hydroxy-terminated isocyanate-reactive components may be used as the isocyanate-reactive component in accordance with the invention.

Suitable hydroxy-terminated components for use as the isocyanate-reactive component include, but are not limited to, polyether polyols, polycaprolactone polyols, polyester polyols, polycarbonate polyols, hydrocarbon polyols, and mixtures thereof. Both saturated and unsaturated polyols are suitable for use with the present invention. The hydroxy-terminated components may have one or more hydrophobic segments and/or one or more hydrophilic segments. The molecular weight of a suitable hydroxy-terminated component may be from about 100 to about 20,000, such as about 200, about 230, about 500, about 600, about 1,000, about 1,500, about 2,000, about 2,500, about 3,000, about 3,500, about 4,000, about 5,000, about 8,000, about 10,000, or any number therebetween.

Suitable polyether polyols for use in the present invention include, but are not limited to, polytetramethylene ether glycol (PTMEG); copolymer of polytetramethylene ether glycol and 2-methyl-1,4-butane diol (PTG-L); poly(oxyethylene)glycol; poly(oxypropylene)glycol; ethylene oxide capped (polyoxypropylene)glycol; poly(oxypropylene oxyethylene)glycol; and mixtures thereof.

In one embodiment, the isocyanate-reactive component is PTMEG and has a molecular weight of about 1000 to about 5000, preferably about 1500 to about 3000, and more preferably about 2000.

Suitable polycaprolactone polyols include, but not limited to, diethylene glycol initiated polycaprolactone; propylene glycol initiated polycaprolactone; 1,4-butanediol initiated polycaprolactone; trimethylol propane initiated polycaprolactone; neopentyl glycol initiated polycaprolactone; 1,6-hexanediol initiated polycaprolactone; polytetramethylene ether glycol (PTMEG) initiated polycaprolactone; ethylene glycol initiated polycaprolactone; dipropylene glycol initiated polycaprolactone; and mixtures thereof.

Suitable polyester polyols include, but not limited to, polyethylene adipate glycol; polyethylene propylene adipate glycol; polybutylene adipate glycol; polyethylene butylene adipate glycol; polyhexamethylene adipate glycol; polyhexamethylene butylene adipate glycol; ortho-phthalate-1,6-hexanediol polyester polyol; polyethylene terephthalate polyester polyols; and mixtures thereof.

Examples of polycarbonate polyols that may be used with the present invention include, but is not limited to, poly (phthalate carbonate)glycol, poly(hexamethylene carbonate) glycol, polycarbonate polyols containing bisphenol A, and mixtures thereof.

Hydrocarbon polyols include, but not limited to, hydroxy-terminated liquid isoprene rubber (LIR), hydroxy-terminated polybutadiene polyol, hydroxy-terminated polyolefin polyols, hydroxy-terminated hydrocarbon polyols, and mixtures thereof.

Other polyols that may be used as the isocyanate-reactive component of the invention include, but not limited to, glycerols; castor oil and its derivatives; Polytail H; Polytail HA; Kraton polyols; acrylic polyols; acid functionalized polyols based on a carboxylic, sulfonic, or phosphoric acid group; dimer alcohols converted from the saturated dimerized fatty acid; and mixtures thereof.

By using polyols based on a hydrophobic backbone, the compositions of the invention may be more water resistant than those compositions having polyols without a hydrophobic backbone. Some non-limiting examples of polyols based on a hydrophobic backbone include hydrocarbon polyols, hydroxy-terminated polybutadiene polyols, polyethers, polycaprolactones, and polyesters.

In addition to the hydroxy-terminated isocyanate-reactive components, any amine-terminated compound available to one of ordinary skill in the art is suitable for use as the isocyanate-reactive component. Amine-terminated components suitable for use as the isocyanate-reactive component may have two, three, four, or more amine end-groups capable of forming urea linkages (such as with isocyanate groups), amide linkages (such as with carboxyl group), imide linkages, and/or other linkages with other organic moieties. As such, the amine-terminated components discussed in this section may also be used as a curing agent to cure a prepolymer. The amine-terminated component may be aromatic, araliphatic, aliphatic, alicyclic, heterocyclic, saturated or unsaturated, and each molecule has at least two isocyanate-reactive amine groups independently being primary or secondary. The amine-terminated segments may be in the form of a primary amine ($NH_2$) or secondary amines (NHR). Depending on the number of isocyanate-reactive amine groups being present, amine-terminated components may be referred to as diamines, triamines, tetramines, and other higher polyamines.

The molecular weight of a suitable amine-terminated compound for use in the invention may range from about 100 to about 20,000, about 100 to about 15,000, about 100 to about 10,000 or any molecular weight therebetween. In one embodiment, the amine-terminated compound is about 200 or greater, preferably about 300 or greater, and even more preferably about 500 or greater. In another embodiment, the amine-terminated compound molecular weight is about 5000 or less, preferably about 3,000 or less, and more preferably about 2,500 or less. For example, in one embodiment, the molecular weight of the amine-terminated compound is about 300 to about 3000.

The amine-terminated compound may include amine-terminated hydrocarbons, amine-terminated polyethers, amine-terminated polyesters, amine-terminated polycarbonates, amine-terminated polycaprolactones, and mixtures thereof. Each of these types of suitable amine-terminated components will be discussed in greater detail below.

For example, the isocyanate-reactive component may be an amine-terminated hydrocarbon having the following generic structure:

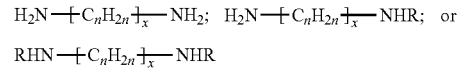

where x is the chain length, i.e., 1 or greater, n is preferably about 1 to about 12, and R is any alkyl group having from about 1 to about 20 carbon atoms, preferably about 1 to about 12 carbon atoms, a phenyl group, a cyclic group, or mixture thereof.

In addition, amine-terminated polyethers having following generic structures are suitable for use as the isocyanate-reactive component according to the invention:

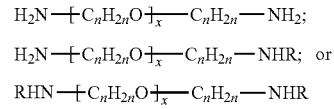

where x is the chain length, i.e., 1 or greater, n is preferably about 1 to about 12, and R is any alkyl group having from about 1 to about 20 carbon atoms, preferably about 1 to about 12 carbon atoms, a phenyl group, a cyclic group, or mixture thereof. One example of an amine-terminated polyether is a polyether amine. As used herein, "polyether amine" refers to a polyoxyalkyleneamine containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

In one embodiment, the polyether amine has the generic structure:

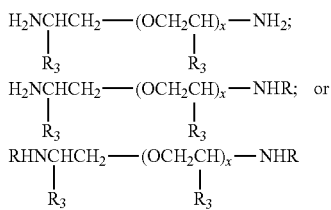

wherein the repeating unit x has a value ranging from about 1 to about 70, R is any alkyl group having from about 1 to about 20 carbon atoms, preferably about 1 to about 12 carbon atoms, a phenyl group, a cyclic group, or mixture thereof, and $R_3$ is a hydrogen, methyl group, or a mixture thereof. Even more preferably, the repeating unit may be from about 5 to about 50, and even more preferably is from about 12 to about 35.

In another embodiment, the polyether amine has the generic structure:

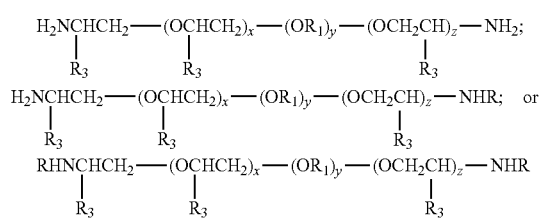

wherein the repeating units x and z have combined values from about 3.6 to about 8 and the repeating unit y has a value ranging from about 9 to about 50, R is an alkyl group having about 1 to about 20 carbons, a phenyl group, a cyclic group, or mixtures thereof, $R_1$ is —$(CH_2)_a$—, wherein "a" may be a repeating unit ranging from about 1 to about 10, a phenylene group, a cyclic group, or mixtures thereof, and $R_3$ is a hydrogen, methyl group, or a mixture thereof.

In yet another embodiment, the polyether amine has the generic structure:

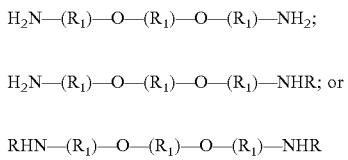

wherein R is an alkyl group having about 1 to about 20 carbons, phenyl groups, cyclic groups, or mixtures thereof, and wherein $R_1$ is —$(CH_2)_a$—, wherein "a" may be a repeating unit ranging from about 1 to about 10, a phenylene group, a cyclic group, or mixtures thereof.

Suitable polyether amines also include, but are not limited to, methyldiethanolamine; polyoxyalkylenediamines such as, polytetramethylene ether diamines, polyoxypropylenetriamine, polyoxyethylene diamines, and polyoxypropylene diamines; poly(ethylene oxide capped oxypropylene) ether diamines; propylene oxide-based triamines; triethyleneglycoldiamines; trimethylolpropane-based triamines; glycerin-based triamines; and mixtures thereof. In one embodiment, the polyether amine used to form the prepolymer is one of Jeffamine® D-2000 and D-4000 (manufactured by Huntsman Corporation of Austin, Tex.), which are amine-terminated polypropylene glycols with molecular weights of 2000 and 4000, respectively.

The molecular weight of the polyether amine for use in the invention may range from about 100 to about 5000. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 4000, preferably about 1000 to about 4000, and more preferably is between about 1500 to about 2500. Because lower molecular weight polyether amines may be prone to forming solid polyureas during prepolymer preparation, a higher molecular weight oligomer, such as Jeffamine® D-2000 and D-4000, may be used.

In addition, the amine-terminated compound may include amine-terminated polyesters having the generic structures:

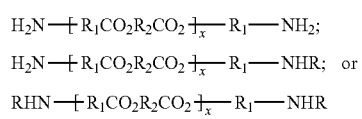

where x is the chain length, i.e., 1 or greater, preferably about 1 to about 20, R is any alkyl group having from about 1 to about 20 carbon atoms, preferably about 1 to about 12 carbon atoms, a phenyl group, a cyclic group, or mixture thereof, and $R_1$ and $R_2$ are straight or branched hydrocarbon chains, e.g., alkyl or aryl chains.

Copolymers of polycaprolactone and polyamines may also be used as the isocyanate-reactive component of the invention. Suitable copolymers include, but are not limited to, bis(2-aminoethyl)ether initiated polycaprolactone, 2-(2-aminoethylamino) ethanol, 2-2(aminoethylamino) ethanol, polyoxyethylene diamine initiated polycaprolactone, propylene diamine initiated polycaprolactone, polyoxypropylene diamine initiated polycaprolactone, 1,4-butanediamine initiated polycaprolactone, trimethylolpropane-based triamine initiated polycaprolactone, neopentyl diamine initiated polycaprolactone, hexanediamine initiated polycaprolactone, polytetramethylene ether diamine initiated polycaprolactone, and mixtures thereof. In addition, polycaprolactone polyamines having the following structures may be useful as the isocyanate-reactive component for use with the present invention:

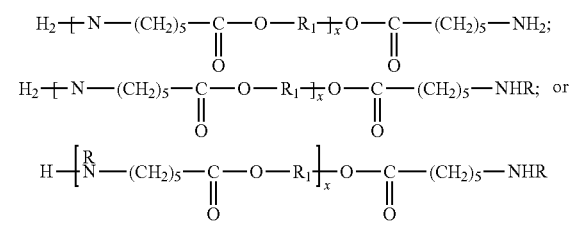

where x is the chain length, i.e., 1 or greater, preferably about 1 to about 20, R is one of an alkyl group having from about 1 to about 20 carbons, preferably about 1 to about 12 carbons, a phenyl group, or a cyclic group, and $R_1$ is a straight or branched hydrocarbon chain including about 1 to about 20 carbons.

Other suitable amine-terminated polycaprolactones include:

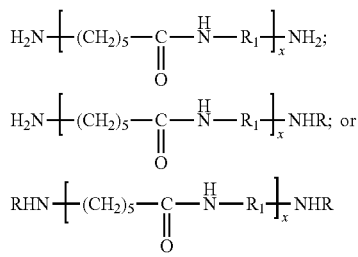

where x is the chain length, i.e., 1 or greater, preferably about 1 to about 20, R is one of an alkyl group having from about 1 to about 20 carbons, preferably about 1 to about 12 carbons, a phenyl group, or a cyclic group, and $R_1$ is a straight or branched hydrocarbon chain including about 1 to about 20 carbons.

In another embodiment, the amine-terminated compound may be an amine-terminated polycarbonate having one of the following generic structures:

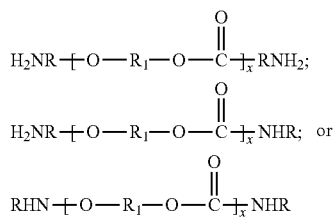

where x is the chain length, which preferably ranges from about 1 to about 20, R is one of an alkyl group having from about 1 to about 20 carbons, preferably about 1 to about 12 carbons, a phenyl group, or a cyclic group, and $R_1$ is a straight chain hydrocarbon or predominantly bisphenol A units or derivatives thereof.

Amine-terminated polyamides may also be used as the isocyanate-reactive component of the invention. Suitable amine-terminated polyamides include, but are not limited to, those having following structures:

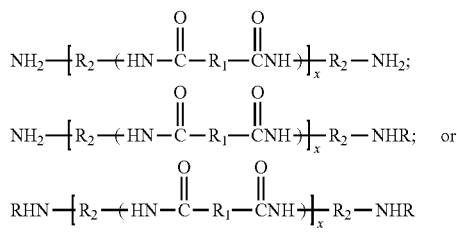

where x is the chain length, i.e., about 1 or greater, R is one of an alkyl group having from about 1 to about 20 carbons, preferably about 1 to about 12 carbons, a phenyl group, or a cyclic group, $R_1$ is an alkyl group having about 1 to about 12 carbon atoms, a phenyl group, or a cyclic group, and $R_2$ is an alkyl group having about 1 to about 12 carbon atoms (straight or branched), a phenyl group, or a cyclic group. Thus, any of the above isocyanate-reactive components, as well as any of the polyamine telechelics taught in U.S. Patent Publication No. 2007/0093317, may be used as the isocyanate-reactive components according to the present invention.

Additional amine-terminated compounds that may be used as isocyanate-reactive components include, but are not limited to, poly(acrylonitrile-co-butadiene); poly(1,4-butanediol) bis(4-aminobenzoate) in liquid or waxy solid form; linear and branched polyethylenimine; low and high molecular weight polyethylenimine having an average molecular weight of about 500 to about 30,000; poly(propylene glycol) bis(2-aminopropyl ether) having an average molecular weight of about 200 to about 5,000; polytetrahydrofuran bis(3-aminopropyl) terminated having an average molecular weight of about 200 to about 2000; and mixtures thereof, all of which are available from Aldrich of Milwaukee, Wis.

Suitable poly(acrylonitrile-co-butadiene) compounds for use with the present invention have one of the following structures:

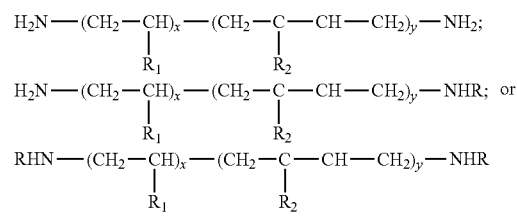

wherein x and y are chain lengths, i.e., greater than about 1, R is any alkyl group having from about 1 to about 20 carbon atoms, preferably about 1 to about 12 carbon atoms, a phenyl group, a cyclic group, or mixture thereof, $R_1$ is a hydrogen, methyl group, cyano group, phenyl group, or a mixture thereof, and $R_2$ is a hydrogen, a methyl group, chloride, or a mixture thereof. In one embodiment, the y:x ratio is about 82:18 to about 90:10. In other words, the poly(acrylonitrile-co-butadiene) may have from about 10 percent to about 18 percent acrylonitrile by weight.

In another embodiment, the composition of the invention includes a poly(1,4-butanediol) bis(4-aminobenzoate) having one of the following structures:

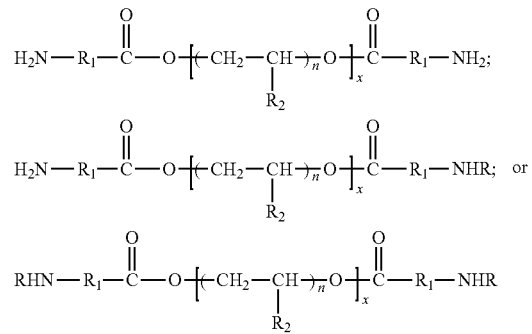

where x and n are chain lengths, i.e., 1 or greater, and n is preferably about 1 to about 12, R and $R_1$ are linear or branched hydrocarbon chains, an alkyl group having from about 1 to about 20 carbons, preferably about 1 to about 12 carbons, a phenyl group, a cyclic group, or mixtures thereof, and $R_2$ is a hydrogen, a methyl group, or a mixture thereof. In one embodiment, $R_1$ is phenyl, $R_2$ is hydrogen, and n is about 2.

In yet another embodiment, at least one linear or branched polyethyleneimine having one of the following structures is used as the isocyanate-reactive component:

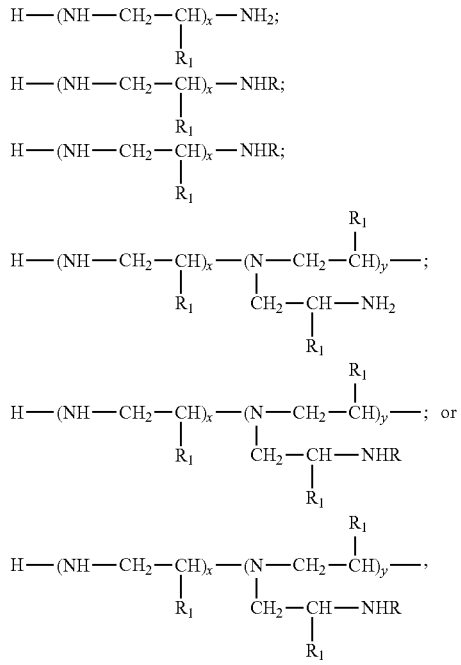

wherein x and y are chain lengths, i.e., greater than about 1, R is any alkyl group having from about 1 to about 20 carbon atoms, preferably about 1 to about 12 carbon atoms, a phenyl group, a cyclic group, or mixture thereof, and $R_1$ is a hydrogen, methyl group, or a mixture thereof. In one embodiment, $R_1$ is hydrogen. In another embodiment, the composition of the invention includes a mixture of linear and branched polyethyleneimines as the isocyanate-reactive component.

In still another embodiment, the composition of the present invention includes a polytetrahydrofuran bis(3-aminopropyl) terminated compound having one of the following structures:

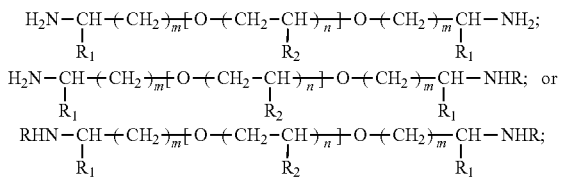

where m and n are chain lengths, i.e., 1 or greater, n is preferably about 1 to about 12 and m is preferably about 1 to about 6, R is any one alkyl group having from about 1 to about 20 carbons, preferably about 1 to about 12 carbons, a phenyl group, a cyclic group, or mixtures thereof, and $R_1$ and $R_2$ are hydrogen, methyl groups, or mixtures thereof. In one embodiment, both $R_1$ and $R_2$ are hydrogen and both m and n are about 2.

By using amine-terminated moieties based on a hydrophobic segment, the polyurea compositions of the invention may be more water resistant than those polyurea compositions formed with an amine-terminated hydrophilic segment. Thus, in one embodiment, the amine-terminated compound includes hydrophobic backbone, e.g., an unsaturated or saturated hydrocarbon-based amine-terminated compound. One example of an amine-terminated hydrocarbon is an amine-terminated polybutadiene.

In addition, as briefly described above, aromatic diamines may be used as the isocyanate-reactive component, preferably with an ultraviolet stabilizer or whitening agent. U.S. Pat. No. 5,484,870 provides suitable aromatic diamines suitable for use with the present invention, the entire disclosure of which is incorporated by reference herein. For example, useful aromatic polyamines include polyamines that have one or more monocyclic or aromatic polycyclic (fused, spiro, and/or bridged) aromatic rings, where at least two isocyanate-reactive amine groups are directly attached to the rings. Such aromatic polyamines may have about 6-60 carbon atoms and, in one embodiment, about 6-22 carbon atoms. Non-limiting examples of single-ring aromatic diamines include o-, m-, or p-phenylenediamine, 1,2-, 1,3-, or 1,4-bis(sec-butylamino)benzene, toluene diamine, 3,5-diethyl-(2,4- or 2,6-)toluenediamine, 3,5-dimethylthio-(2,4- or 2,6-)toluenediamine, and 3,5-diethylthio-(2,4- or 2,6-)toluenediamine. Suitable fused polycyclic aromatic diamines include, but are not limited to, 1,4-, 1,6-, 1,8-, and 2,7-diaminonaphthalene.

Non-limiting examples of dual-ring aromatic polyamines include 4,4'-diaminodiphenyl ether, 4,4'-diaminodiphenylmethane ("MDA"), 4,4'-diaminodiphenylpropane, 3,3'-dimethyl-4,4'-diaminodiphenylmethane, 3,3'-diethyl-5,5'-dimethyl-4,4'-diaminodiphenylmethane, 3,3'-dichloro-4,4'-diaminodiphenylmethane ("MOCA"), 3,3'-diethyl-5,5'-dichloro-4,4'-diaminodiphenylmethane, 3,3',5,5'-tetraethyl-4,4'-diaminodiphenylmethane ("MDEA"), 3,3',5,5'-tetraisopropyl-4,4'-diaminodiphenylmethane, 3,3'-dimethyl-5,5'-diisopropyl-4,4'-diaminodiphenylmethane, 3,3'-diethyl-5,5'-diisopropyl-4,4'-diaminodiphenylmethane, 3,3'-dimethyl-5,5'-di-t-butyl-4,4'-diaminodiphenylmethane, 2,2'-dichloro-3,3',5,5'-tetraethyl-4,4'-diaminodiphenylmethane ("MCDEA"), 3,3'-dichloro-4,4'-diaminodiphenylmethane, 2,2',3,3'-tetrachloro-4,4'-diaminodiphenylmethane ("MDCA"), 4,4'-bis(sec-butylamino)-diphenylmethane, 3,3'-dichloro-2,2',6,6'-tetraethyl-4,4'-diaminodiphenylmethane, and N,N'-dialkylamino-diphenylmethane.

In addition, triamines that may be used in forming the prepolymer of the invention include N,N,N',N'-tetramethylethylenediamine, 1,4-diazobicyclo(2,2,2)-octane, N-methyl-N'-dimethylaminoethylpiperazine, N,N-dimethylbenzylamine, bis-(N,N-diethylaminoethyl)-adipate, N,N-diethylbenzylamine, pentamethyldiethylenetriamine, N,N-dimethylclyclohexylamine, N,N,N',N'-tetramethyl-1,3-butanediamine, N,N-dimethyl-beta-phenylethylamine, 1,2-dimethylimidazole, and 2-methylimidazole. Other nonlimiting examples of triamines for use as the isocyanate-reactive component of the invention include diethylene triamine, dipropylene triamine, N-(aminopropyl)ethylenediamine, N-(aminoethyl)butylenediamine, N-(aminopropyl) butylenediamine, N-(aminoethyl)hexamethylenediamine, N-(aminopropyl)hexamethylenediamine, 4-aminomethyloctane-1,8-diamine, (propylene oxide)-based triamines (a.k.a. polyoxypropylene triamines), trimethylolpropane-based triamines, glycerin-based triamines, 3-(2-aminoethyl)aminopropylamine (i.e., N-(2-aminoethyl)-1,3-propylenediamine, $N_3$-amine), N,N-bis(2-((aminocarbonyl)amino)ethyl)urea, N,N',N''-tris(2-aminoethyl)methanetriamine, N1-(5-aminopentyl)-1,2,6-hexanetriamine, 1,1,2-ethanetriamine, N,N',N''-tris(3-aminopropyl)methanetriamine, N1-(2-aminoethyl)-1,2,6-hexanetriamine, $N_1$-(10-aminodecyl)-1,2,6-hexanetriamine, 1,9,18-octadecanetriamine, 4,10,16,22-tetraazapentacosane-1,13,25-triamine, N1-(3-((4-((3-aminopropyl)amino)butyl)amino)propyl)-1,2,6-hexanetriamine, di-9-octadecenyl-(Z,Z)-1,2,3-propanetriamine, 1,4,8-octanetriamine, 1,5,9-nonanetriamine, 1,9,10-octadecanetriamine, 1,4,7-heptanetriamine, 1,5,10-decanetriamine, 1,8,17-heptadecanetriamine, 1,2,4-butanetriamine, 1,3,5-pentanetriamine, N1-(4-((3-aminopropyl)amino)butyl)-1,2,6-hexanetriamine, 2,5-dimethyl-1,4,7-heptanetriamine, N1-6-aminohexyl-1,2,6-hexanetriamine, 6-ethyl-3,9-dimethyl-3,6,9-undecanetriamine, 1,5,11-undecanetriamine, 1,6,11-undecanetriamine, N,N-bis(aminomethyl)methanediamine, N,N-bis(2-aminoethyl)-1,3-propanediamine, methanetriamine, N1-(2-aminoethyl)-N-2-(3-aminopropyl)-1,2,5-pentanetriamine, N1-(2-aminoethyl)-1,2,6-hexanetriamine, 2,6,11-trimethyl-2,6,11-dodecanetriamine, 1,1,3-propanetriamine, 6-(aminomethyl)-1,4,9-nonanetriamine, 1,2,6-hexanetriamine, N2-(2-aminoethyl)-1,1,2-ethanetriamine, 1,3,6-hexanetriamine, N,N-bis(2-aminoethyl)-1,2-ethanediamine, 3-(aminomethyl)-1,2,4-butanetriamine, 1,1,1-ethanetriamine, N1,N1-bis(2-aminoethyl)-1,2-propanediamine, 1,2,3-propanetriamine, 2-methyl-1,2,3-propanetriamine, and mixtures thereof.

Non-limiting examples of tetramines include triethylene tetramine (i.e., bis(aminoethyl)ethylenediamine), tetraethylene tetramine, tripropylene tetramine, N,N'-bis(3-aminopropyl)ethylenediamine (a.k.a. $N_4$-amine, N,N'-1,2-ethanediyl-bis-(1,3-propanediamine), 1,5,8,12-tetrazadodecane), bis(aminoethyl)propylenediamine, bis(aminoethyl)butylenediamine, bis(aminopropyl)butylenediamine, bis(aminoethyl)hexamethylenediamine, bis(aminopropyl)hexamethylenediamine. Illustrative examples of other higher polyamines include tetraethylene pentamine, pentaethylene hexamine, polymethylene-polyphenylamine, and mixtures thereof.

In one embodiment, the isocyanate-reactive component of the invention is a secondary diamine or secondary triamine where the amine end groups of the base diamine or triamine are reacted with a ketone, such as acetone or other suitable solvent, and reduced to create hindered secondary amine end groups represented by the following terminal structure:

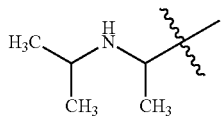 [SMILES: *C(C)NC(C)C]

Without being bound to any particular theory, one reactive hydrogen on each end group provides for more selective reactivity and makes the secondary diamine or secondary triamine intrinsically slower to react that primary diamines, possibly because an amine with a high level of stearic hindrance, e.g., a tertiary butyl group on the nitrogen atom, has a slower reaction rate than an amine with no hindrance or a low level of hindrance.

In this regard, the molecular weight of the secondary diamine is preferably between about 100 and 5000, preferably about 200 to about 2500, and more preferably about 300 to about 2100. In one embodiment, the molecular weight of the secondary diamine isocyanate-reactive component is about 1800 to about 2100, preferably about 1900 to about 2075. When the isocyanate-reactive component is a secondary triamine, the molecular weight may range from about 50 to about 2000, preferably about 100 to about 1000, and more preferably about 300 to about 700. For example, the molecular weight of a suitable secondary triamine for use as the isocyanate-reactive component may range from about 500 to about 600.

The secondary diamines and secondary triamines preferably have a low amount of primary amine, i.e., less than about 5 percent, preferably less than about 3 percent, and more preferably less than 2 percent. In addition, this category of isocyanate-reactive components have a relatively low kinematic viscosity as compared with other amine-terminated components. For example, the kinematic viscosity of suitable secondary diamines and secondary triamines for use with the present invention may range from about 5 cSt to about 500 cSt at 25° C. (77° F.). In one embodiment, the kinematic viscosity of the isocyanate-reactive component is about 180 cSt to about 250 cSt at 25° C. (77° F.). In another embodiment, the kinematic viscosity ranges from about 5 cSt to about 50 cSt at 25° C. (77° F.).

Commercially available examples of suitable secondary diamines include JEFFAMINE® XTJ-584, XTJ-585, and XTJ-576, available from Huntsman Corporation. JEFFAMINE® XTJ-586, also available from Huntsman, is a commercially available secondary triamine for use as the isocyanate-reactive component.

In this aspect of the invention, a suitable secondary diamine for use as the isocyanate-reactive component may be based on an amine-terminated polypropylene glycol (PPG) with the following representative structure:

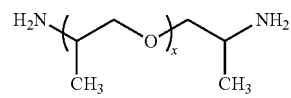

where x is the chain length preferably about 1 or greater, and more preferably about 1 to about 70. In one embodiment, x is about 2 to about 68. In another embodiment, x is from about 25 to about 40, preferably about 30 to about 38. In yet another embodiment, x ranges from about 2 to about 10. In still another embodiment, x is from about 60 to about 70, preferably about 65 to about 70. The molecular weight of the amine-terminated PPG may range from about 200 to about 4500. In one embodiment, the molecular weight is from about 210 to about 450. In another embodiment, the molecular weight is from about 1800 to about 4200. In yet another embodiment, the molecular weight is from about 1900 to about 2500. In still another embodiment, the molecular weight is from about 3800 to about 4200. Commercially available examples of suitable base diamines for use in forming the secondary diamines include JEFFAMINE® D-230, D-400, D-2000, and D-4000, available from Huntsman Corporation.

The secondary triamine may be based on a triamine prepared by the reaction of propylene oxide with a triol initiator, followed by amination of the terminal hydroxyl groups, which are shown in the following representative structure:

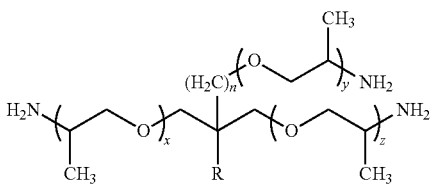

where n may range from 0 to about 2, preferably from 0 to about 1; x, y, and z are chain lengths, preferably 1 or greater; and R may be hydrogen or an alkyl group. Moles propylene oxide are represented by x+y+z, which may range from about 4 to about 90. In one embodiment, x+y+z is about 5 to about 6. In another embodiment, x+y+z is from about 40 to about 60, preferably about 45 to about 55, and more preferably 48 to about 52. In yet another embodiment, x+y+z is from about 70 to about 95, preferably about 80 to about 90, and more preferably about 83 to about 88. Commercially available base triamines suitable for use in forming the secondary triamine include JEFFAMINE® T-403, T-3000, and T-5000, available from Huntsman Corporation.

Any one or more of the hydrogen atoms in the amine-terminated component (other than those in the terminal groups) may be substituted with halogens, cationic groups, anionic groups, silicon-based moieties, ester moieties, ether moieties, amide moieties, urethane moieties, urea moieties, ethylenically unsaturated moieties, acetylenically unsaturated moieties, aromatic moieties, heterocyclic moieties, hydroxy groups, amine groups, cyano groups, nitro groups, and/or any other organic moieties. For example, the amine-terminated component may be halogenated, such as having fluorinated backbones and/or N-alkylated fluorinated side chains.

In one embodiment, at least two isocyanate-reactive components are employed where one isocyanate-reactive component is amine-terminated and a second is hydroxy-terminated. Any of the previously discussed amine-terminated and hydroxy-terminated components are suitable for use in this regard. However, as discussed above, once a hydroxy-terminated isocyanate-reactive component is used, the composition includes urethane linkages and, thus, is no longer pure polyurea for the purposes of the present invention. Rather, this composition includes both urea and urethane linkages.

In another embodiment, the isocyanate-reactive component is an aminoalcohol component, i.e., a polymer having at least one amine end group and at least one hydroxy end group. This category of isocyanate-reactive components includes polymers that are linear, branched, block, graft, monodisperse, polydisperse, regular, irregular, tactic, isotactic, syndiotactic, stereoregular, atactic, stereoblock, single-strand, double-strand, star, comb, dendritic, and/or ionomeric, and also includes homopolymers, random copolymers, pseudo-copolymers, statistical copolymers, alternating copolymers, periodic copolymer, bipolymers, terpolymers, quaterpolymers, as well as derivatives of any and all hydroxy-terminated and amine-terminated components disclosed herein.

Aminoalcohol components can have any of the polymer or copolymer structures of the herein-described hydroxy-terminated and amine-terminated components, such as poly-hydrocarbons (such as polydienes), polyethers, polyesters (such as polycaprolactones), polyamides (such as polycaprolactams), polycarbonates, polyacrylates (such as polyalkylacrylates), polysiloxanes, and copolymers thereof. Suitable aminoalcohol components, including generic structures and specific examples, are disclosed in U.S. Pat. Nos. 7,259,222 and 7,105,628, the entire disclosures of which are incorporated by express reference herein. For example, the aminoalcohol may include a polypropylene glycol-based amine and a caprolactone monomer.

Aminoalcohols useful in the present disclosure include any and all monomers, oligomers, and polymers having at least one free isocyanate-reactive hydroxy group and at least one free isocyanate-reactive amine group. The hydroxy and amine groups may be primary or secondary, terminal or pendant groups on the oligomeric or polymeric backbone, and in the case of secondary or tertiary amine groups, may be embedded within the backbone. Aminoalcohols can be linear or branched, saturated or unsaturated, aliphatic, alicyclic, aromatic, or heterocyclic. The aminoalcohol may have the following general structure:

where R is hydrogen, hydrocarbyl or hydroxyhydrocarbyl group (such as —$R_1$—OH) having about 1-12 carbon atoms, such as about 1-8 or about 1-4 carbon atoms; $R_1$ is a divalent hydrocarbyl moiety having about 2-30 carbon atoms; each x is independently about 1-15; and y is about 1-3. R and $R_1$ can independently be acyclic, alicyclic or aromatic. These aminoalcohols include alkanolamines, N-(hydroxyhydrocarbyl)amines, hydroxypoly(hydrocarbyloxy)amines, and hydroxypoly(hydroxyl-substituted oxyalkylene)amines, conveniently prepared by reaction of one or more epoxides with amines, and are also known as alkoxylated amines (when y is 1) or diamines (when y is 2).

$R_1$ may also be linear or branched alkylene having about 2-30 carbon atoms, such as about 4 or 6 carbon atoms or any number therebetween, like ethylene, propylene, 1,2-butylene, 1,2-octadecylene, and the like. R can be methyl, ethyl, propyl, butyl, pentyl, or hexyl group. Non-limiting examples of these alkanolamines include monoethanolamine, diethanolamine, diethylethanolamine, ethylethanolamine, monoisopropanolamine, diisopropanolamine, butyldiethanolamine, and the like. Non-limiting examples of hydroxyhydrocarbylamines include 2-hydroxyethylhexylamine, 2-hydroxyethyloctylamine, 2-hydroxyethylpentadecylamine, 2-hydroxyethyloleylamine, 2-hydroxyethylsoyamine, 2-hydroxyethoxyethylhexylamine, and mixtures thereof.

The aminoalcohol may also be hydroxy-containing polyamine, such as analogs of hydroxy monoamines, like alkoxylated alkylenepolyamines (e.g., N,N-(diethanol)ethylene diamines). Such polyaminoalcohols may be prepared by reacting one or more cyclic ethers such as those disclosed herein with the diamines and higher polyamines disclosed herein, such as alkylene polyamines, or with the various aminoalcohols, such as those disclosed herein, including primary, secondary, and tertiary alkanolamines, with a molar ratio of about 1:1 to about 2:1. Reactant ratios and temperatures for carrying out such reactions are known to those skilled in the art. Specific examples of hydroxy-containing polyamines include N-(2-hydroxyethyl)ethylenediamine, N,N'-bis(2-hydroxyethyl)ethylenediamine, 1-(2-hydroxyethyl)piperazine, mono(hydroxypropyl)-substituted tetraethylenepentamine, N-(3-hydroxybutyl)-tetramethylene diamine, and the like. Higher homologs obtained by condensation of the above-illustrated hydroxy-containing polyamines through amine and/or hydroxyl groups are likewise useful. Condensation through amine groups can result in a higher amine accompanied by removal of ammonia while condensation through the hydroxyl groups can result in products containing ether linkages accompanied by removal of water.

Other examples of aminoalcohols include N-(2-hydroxyethyl)cyclohexylamine, 3-hydroxycyclopentylamine, para-hydroxyaniline, 2-propanol-1,1'-phenylaminobis, N-hydroxyethylpiperazine, 2-aminoethanol, 3-amino-1-propanol, 1-amino-2-propanol, 2-(2-aminoethoxy)ethanol, 2-[(2-aminoethyl)amino]ethanol, 2-methylaminoethanol, 2-(ethylamino)ethanol, 2-butylaminoethanol, diethanolamine, 3-[(hydroxyethyl)amino]-1-propanol, diisopropanolamine, bis(hydroxyethyl)-aminoethylamine, bis(hydroxypropyl)-aminoethylamine, bis(hydroxyethyl)-aminopropylamine, bis(hydroxypropyl)-aminopropylamine, hydroxy-functional amino acids as described herein, and mixtures thereof.

Curing Agent

The curing agent for use with the present invention include, but are not limited to, hydroxy terminated curing agents, amine-terminated curing agents, and mixtures thereof. As known to those of ordinary skill in the art, the type of curing agent used determines whether the composition is polyurea/urethane or polyurea/urethane. For example, a prepolymer containing only urethane linkages cured with a hydroxy-terminated curing agent is pure polyurethane because any excess isocyanate groups will react with the hydroxyl groups of the curing agent to create more urethane linkages. In contrast, if an amine-terminated curing agent is used with a prepolymer containing only urea linkages, the excess isocyanate groups will react with the amine groups of the amine-terminated curing agent to create more urea linkages resulting in a pure polyurea composition.

In one embodiment, the curing agent is a hydroxy-terminated curing agent. Suitable hydroxy-terminated curing agents include, but are not limited to, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N'N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy) ethoxy]cyclohexane; 1,3-bis-{2-[2-(2-hydroxyethoxy)ethoxy]ethoxy}cyclohexane; polytetramethylene ether glycol, preferably having a molecular weight ranging from about 250 to about 3900; resorcinol-di-(β-hydroxyethyl)ether and its derivatives; hydroquinone-di-(beta-hydroxyethyl)ether and its derivatives; 1,3-bis-(2-hydroxyethoxy)benzene; 1,3-bis-[2-(2-hydroxyethoxy) ethoxy]benzene; N,N-bis((3-hydroxypropyl) aniline; 2-propanol-1,1'-phenylaminobis; and mixtures thereof. The hydroxy-terminated curing agent may have a molecular weight of at least about 50. In one embodiment, the molecular weight of the hydroxy-terminated curing agent is about 2000 or less.

Of the list above, the saturated hydroxy-terminated curing agents are preferred when making a light stable composition. Those saturated hydroxy-terminated curing agents include, but are not limited to, ethylene glycol; diethylene glycol; polyethylene glycol; propylene glycol; 2-methyl-1,3-propanediol; 2,-methyl-1,4-butanediol; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; polytetramethylene ether glycol having molecular weight ranging from about 250 to about 3900; and mixtures thereof.

In this aspect of the invention, the curing agent may be based on polytetrahydrofuran diol (also known as polytetramethylene ether glycol). For example, a suitable curing agent for use with the present invention may have the following structure:

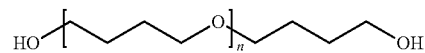

where n is the chain length from 2 to 30. In one embodiment, n is about 7 to about 8, about 12-13, about 26-27, or any number therebetween. The molecular weight of this type of curing agent may range from about 200 to about 3000, about 400 to about 2550, about 650 to about 2000, and any molecular weight therebetween. The hydroxyl number (mg KOH/g) preferably ranges from about 50 to about 200, about 105 to about 120, about 50 to about 60, about 165 to about 180, and any number therebetween. Commercially available examples of such hydroxy-terminated curing agents include Poly THF® 650, 1000, and 2000, manufactured by BASF Corporation.

In another embodiment, the curing agent is amine-terminated. Suitable amine-terminated curing agents include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane and derivatives thereof; 1,4-bis-(sec-butylamino)-cyclohexane; 1,2-bis-(sec-butylamino)-cyclohexane; 4,4'-dicyclohexylmethane diamine; 1,4-cyclohexane-bis-(methylamine); 1,3-cyclohexane-bis-(methylamine); diethylene glycol bis-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; 4,4'-methylenebis-(2-chloroaniline); 3,5-dimethylthio-2,4-toluenediamine; 3,5-dimethylthio-2,6-toluenediamine; 3,5-diethylthio-2,4-toluenediamine; 3,5-diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; N,N'-diisopropyl-isophoronediamine; polyoxypropylene diamine; propylene oxide-based triamine; 3,3'-dimethyl-4,4'-diaminocyclohexylmethane; and mixtures thereof. In one embodiment, the amine-terminated curing agent is 4,4'-bis-(sec-butylamino)-dicyclohexylmethane. In one embodiment, the amine-terminated curing agent may have a molecular weight of about 64 or greater. In another embodiment, the molecular weight of the amine-curing agent is about 2000 or less. In addition, any of the amine-terminated moieties listed above may be used as curing agents to react with the polyurea prepolymers.

Of the list above, the saturated amine-terminated curing agents suitable for use with the present invention include, but are not limited to, ethylene diamine; hexamethylene diamine; 1-methyl-2,6-cyclohexyl diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol bis-(aminopropyl) ether; 2-methylpentamethylenediamine; diaminocyclohexane; diethylene triamine; triethylene tetramine; tetraethylene pentamine; propylene diamine; 1,3-diaminopropane; dimethylamino propylamine; diethylamino propylamine; imido-bis-(propylamine); monoethanolamine, diethanolamine; triethanolamine; monoisopropanolamine, diisopropanolamine; isophoronediamine; and mixtures thereof.

The amine-terminated curing agent may also be an amine-functional aspartic ester. For example, the amine-terminated curing agent may be a polyaspartate prepared from 2-methyl-1,5-pentane diamine. A commercially available example of this type of curing agent is Desmophen® NH 1220 from Huntsman. Those of ordinary skill in the art would also be aware of methods of forming such amine-terminated curing agents. For example, U.S. Pat. No. 6,790,925, the entire disclosure of which is incorporated by reference herein, discusses in-situ methods of preparing polyaspartic esters that are suitable for use as the curing agent according to the present invention.

As briefly discussed above with regard to the use of a secondary diamine or secondary triamine as an isocyanate-reactive component, many amines may be undesirable for reaction with the isocyanate because of the rapid reaction between the free NCO groups and the amine end groups. This same issue exists when selecting a suitable curing agent. For example, in general, unhindered primary diamines are fast reacting and, thus, the selection of a primary diamine as the curing agent may be problematic depending on the processing conditions. As such, in one embodiment, a hindered secondary diamine may be used as the curing agent. For example, 4,4'-bis-(sec-butylamino)-dicyclohexylmethane or 3,3'-dimethyl-4,4'-bis(sec-butylamino)-dicyclohexylmethane, both of which are commercially available from Dorf Ketal as Clearlink® 1000 and Clearlink® 3000, respectively, are suitable for use in combination with an isocyanate to form the polyurea prepolymer. In addition, N,N'-diisopropyl-isophorone diamine, available from Huntsman Corporation under the tradename Jefflink®, may be used as the secondary diamine curing agent. Furthermore, secondary diamines based on methylene dianiline may be used as curing agents. For example, Unilink® 4200, available from Dorf Ketal, is suitable for use as a curing agent.

Thus, both types of curing agents, i.e., hydroxy-terminated and amine-terminated curatives, may include one or more saturated, unsaturated, aromatic, and cyclic groups. Additionally, the hydroxy-terminated and amine-terminated curatives may include one or more halogen groups. To further improve the shear resistance of the resulting polyurea elastomers, a trifunctional curing agent can be used to help improve cross-linking. For instance, triols such as trimethylolpropane or a tetraol such as N,N,N',N'-tetrakis (2-hydroxylpropyl)ethylenediamine may be added to the formulations.

In one embodiment, the curing agent is a modified curative blend as disclosed in co-pending U.S. Pat. No. 7,041,769, which is incorporated by reference herein in its entirety.

Forming the Compositions of the Invention

There are two basic techniques used to process the compositions of the invention: the one-shot technique and the prepolymer technique. The one-shot technique reacts the isocyanate-containing compound, the isocyanate-reactive compound, and an optional curing agent in one step, whereas the prepolymer technique requires a first reaction between the isocyanate-reactive compound and the isocyanate-containing compound to produce a prepolymer, and a subsequent reaction between the prepolymer and a curing agent. Either method may be employed to produce the compositions of the invention, however, the prepolymer technique is generally preferred because it provides better control of chemical reaction and, consequently, results in more uniform properties for the resultant composition.

Thus, in one embodiment, the compositions of the invention may be formed by reacting at least one isocyanate-containing component with at least one isocyanate-reactive component to form a prepolymer and chain extending the prepolymer with a curing agent to cure the system. In particular, any of the isocyanate-containing components disused earlier may be reacted with any of the isocyanate-reactive components discussed above to form a prepolymer. For example, in one embodiment, the prepolymer is formed from an isocyanate-containing component and a hydroxyl-terminated isocyanate-reactive component and consists essentially of urethane linkages.

In another aspect of the invention, the isocyanate-containing component for use with the present invention may include an aromatic isocyanate that is hybridized with an aliphatic isocyanate. For example, an aromatic isocyanate may be reacted with an isocyanate-reactive component, such as an amine-terminated component, to form an intermediate prepolymer and then the prepolymer is heated at a temperature sufficient to allow further reaction between the functional groups of the prepolymer and an aliphatic isocyanate, which is added in excess. The result is a prepolymer with aliphatic isocyanate groups at both ends. In one embodiment, the temperature sufficient to allow further reaction between the functional groups of the intermediate prepolymer and the NCO groups in the aliphatic isocyanate is from about 60° C. to about 90° C., preferably about 70° C. to about 80° C. For the purposes of this aspect of the invention, any of the aromatic and aliphatic isocyanate-containing components discussed earlier may be used.

Once formed, the prepolymer preferably has about 3 percent to about 20 percent free isocyanate monomer (NCO groups). In one embodiment, the NCO content of the prepolymer is about 4 percent and 10 percent. In another embodiment, the prepolymer has about 5 percent to about 7 percent NCO groups. For example, the prepolymer may have about 6 to about 6.5 percent NCO groups.

Without being bound to any particular theory, the number of unreacted NCO groups in the prepolymer may be varied to control such factors as the speed of the reaction, the resultant hardness of the composition, and the like. In this aspect of the invention, the prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

Skilled artisans are also aware that the various properties of the golf ball and golf ball components, e.g., hardness, may be controlled by adjusting the ratio of prepolymer to curing agent, which is a function of the NCO content of the prepolymer, discussed above, and molecular weight of the curing agent. For example, the ratio of a prepolymer with 6 percent unreacted NCO groups cured with 1,4-butanediol is 15.6:1, whereas the ratio of the same prepolymer cured with 4,4'-bis-(sec-butylamino)-dicyclohexylmethane is 4.36:1. The ratio of prepolymer to curing agent for the purposes of this invention is preferably from about 0.5:1 to about 16:1. Those of ordinary skill in the art would be aware that the ratio should be adjusted to maximize resiliency depending on the type of layer formed from the composition of the invention. For example, when forming a cover from the composition of the invention, the ratio of the prepolymer to curative may be about 1:0.95.

Likewise, the ratio of prepolymer to curing agent plays a role in determining whether the compositions is thermoset or thermoplastic. For example, prepolymers crosslinked with a curing agent with 1:1 stoichiometry are thermoplastic in nature. Thermoset polyurethanes, on the other hand, are generally produced when the ratio of prepolymer to curing agent is less than 1. For example, the composition may be thermoset when the prepolymer to secondary diamine curing agent is 1:0.95.

Because the selection of curing agent determines whether a composition of the invention will be thermoplastic or thermoset, the method of molding the compositions of the invention onto the ball also will vary depending on the type of composition. For example, thermoplastic polyurea compositions of the present invention may be used to make thermoplastic pellets that can be molded onto the ball by injection molding or compression molding. Thermoset polyurea compositions may be cast onto the ball. In addition, both the thermoplastic and thermoset polyurea compositions of the present invention also may be formed around the core using reaction injection molding (RIM) and liquid injection molding (LIM) techniques.

The compositions of the invention may have a material hardness of about 6 Shore D to about 30 Shore D. In one embodiment, the material hardness of the composition of the invention is about 10 Shore D to about 20 Shore D. In another embodiment, the material hardness is about 8 Shore D to about 16 Shore D, preferably about 8 Shore D to about 14 Shore D. In still another embodiment, the material hardness is about 10 Shore D to about 14 Shore D, preferably about 10 Shore D to about 12 Shore D.

Additives

Additional materials conventionally included in polyurethane and/or polyurea compositions may be added to the prepolymers or cured compositions of the invention. These additional materials include, but are not limited to, catalysts, wetting agents, coloring agents, optical brighteners, crosslinking agents, whitening agents such as $TiO_2$ and ZnO, UV absorbers, hindered amine light stabilizers, defoaming agents, processing aids, surfactants, and other conventional additives. For example, wetting additives may be added to the modified curative blends of the invention to more effectively disperse the pigment(s). Suitable wetting agents are available from Byk-Chemle and Crompton Corporation, among others.

Antioxidants, stabilizers, softening agents, plasticizers, including internal and external plasticizers, impact modifiers, foaming agents, density-adjusting fillers, reinforcing materials, and compatibilizers may also be added to any composition of the invention. Those of ordinary skill in the art are aware of the purpose of these additives and the amounts that should be employed to fulfill those purposes.

For example, a catalyst may also be employed to modify the reaction rate between the prepolymer and the curing agent. Suitable catalysts include, but are not limited to bismuth catalyst; zinc octoate; stannous octoate; tin catalysts such as di-butyltin dilaurate (DABCO® T-12 manufactured by Air Products and Chemicals, Inc.), di-butyltin diacetate (DABCO® T-1); stannous octoate (DABCO® T-9); tin (II) chloride, tin (IV) chloride, di-butyltin dimethoxide (FAS-CAT8-4211), dimethyl-bis[1-oxonedecyl)oxy]stannane (FORMEZ® UL-28), di-n-octyltin bis-isooctyl mercaptoacetate (FORMEZ® UL-29); amine catalysts such as triethylenediamine (DABCO® 33-LV), triethylamine, and tributylamine; organic acids such as oleic acid and acetic acid; delayed catalysts such as POLYCAT™ SA-1, POLYCAT™ SA-2, POLYCAT™, and the like; and mixtures thereof.

The catalyst is preferably added in an amount sufficient to catalyze the reaction of the components in the reactive mixture. In one embodiment, the catalyst is present in an amount from about 0.001 percent to about 5 percent by weight of the composition. For example, when using a tin catalyst, such as di-butyltin dilaurate, the catalyst is preferably present in an amount from about 0.005 percent to about 1 percent. In another embodiment, the catalyst is present in an amount of about 0.05 weight percent or greater. In another embodiment, the catalyst is present in an amount of about 0.5 weight percent or greater.

Use of low levels of tin catalysts, typically from about 0 to about 0.04 weight percent of the total composition, requires high temperatures to achieve a suitable reaction rate, which may result in degradation of the prepolymer. Increasing the amount of catalysts to unconventional high levels enables the reduction in process temperatures while retaining comparable cure stages. Use of the higher catalyst level also allows the mixing speeds to be reduced. Thus, in one embodiment, the tin catalyst is present in an amount from about 0.01 percent to about 0.55 percent by weight of the composition. In another embodiment, about 0.05 percent to about 0.4 percent of tin catalyst is present in the composition. In yet another embodiment, the tin catalyst is present in an amount from about 0.1 percent to about 0.25 percent.

Without being bound to any particular theory, when used with a prepolymer containing urea linkages, a catalyst such as di-butyltin dilaurate inhibits or slows down the cure rate. However, when used with a prepolymer containing urethane linkages, di-butyltin dilaurate accelerates the reaction rate. One of ordinary skill in the art would be able to select the type and amount of catalyst best suited for the particular type of composition formed according to the invention.

Density-Adjusting Filler(s)

Fillers may be added to the compositions of the invention to affect rheological and mixing properties, the specific gravity (i.e., density-modifying fillers), the modulus, the tear strength, reinforcement, and the like. The fillers are generally inorganic, and suitable fillers include numerous metals, metal oxides and salts, such as zinc oxide and tin oxide, as well as barium sulfate, zinc sulfate, calcium carbonate, zinc carbonate, barium carbonate, clay, tungsten, tungsten carbide, an array of silicas, regrind (recycled core material typically ground to about 30 mesh particle), high-Mooney-viscosity rubber regrind, and mixtures thereof.

For example, the compositions of the invention can be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known to those with skill in the art. The selection of such filler(s) is dependent upon the type of golf ball desired, i.e., one-piece, two-piece, multi-component, or wound, as will be more fully detailed below. Generally, the filler will be inorganic, having a density of greater than 4 g/cc, and will be present in amounts between about 5 and about 65 weight percent based on the total weight of the polymer components included in the layer(s) in question. Examples of useful fillers include zinc oxide, barium sulfate, calcium oxide, calcium carbonate, and silica, as well as other known corresponding salts and oxides thereof.

Fillers may also be used to modify the weight of the core or at least one additional layer for specialty balls, e.g., a lower weight ball is preferred for a player having a low swing speed.

Blowing or Foaming Agent(s)

The compositions of the invention may be foamed by the addition of the at least one physical or chemical blowing or foaming agent. The use of a foamed polymer allows the golf ball designer to adjust the density or mass distribution of the ball to adjust the angular moment of inertia, and, thus, the spin rate and performance of the ball. Foamed materials also offer a potential cost savings due to the reduced use of polymeric material.

Blowing or foaming agents useful include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenylmethyl-uranthan; p-sulfonhydrazide; peroxides; and inorganic blowing agents such as ammonium bicarbonate and sodium bicarbonate. A gas, such as air, nitrogen, carbon dioxide, etc., can also be injected into the composition during the injection molding process.

Additionally, a foamed composition of the present invention may be formed by blending microspheres with the composition either during or before the molding process. Polymeric, ceramic, metal, and glass microspheres are useful in the invention, and may be solid or hollow and filled or unfilled. In particular, microspheres up to about 1000 micrometers in diameter are useful. Furthermore, the use of liquid nitrogen for foaming, as disclosed in U.S. Pat. No. 6,386,992, which is incorporated by reference herein, may produce highly uniform foamed compositions for use in the present invention.

Either injection molding or compression molding may be used to form a layer or a core including a foamed polymeric material. For example, a composition of the present invention can be thermoformed and, thus, can be compression molded. For compression molded grafted metallocene catalyzed polymer blend layers, half-shells may be made by injection molding a grafted metallocene catalyzed polymer blend in a conventional half-shell mold or by compression molding sheets of foamed grafted metallocene catalyzed polymer. The half-shells are placed about a previously formed center or core, cover, or mantle layer, and the assembly is introduced into a compression molding machine, and compression molded at about 250° F. to 400° F. The molded balls are then cooled while still in the mold, and finally removed when the layer of grafted metallocene catalyzed polymer blend is hard enough to be handled without deforming. Additional core, mantle, and cover layers are then molded onto the previously molded layers, as needed, until a complete ball is formed.

Light Stabilizers and Pigments

As discussed above, there are numerous ways to attain light stability over time, including using only saturated components and incorporating UV absorbers and light stabilizers. For example, the addition of UV absorbers and light stabilizers to any of the above unsaturated compositions is recommended to prevent significant yellowing and may also help to maintain the tensile strength, elongation, and color stability in compositions including only saturated components. The use of light stabilizers may also assist in preventing cover surface fractures due to photodegradation in both types of compositions. As used herein, the term "light stabilizer" may be understood to include hindered amine light stabilizers, ultraviolet (UV) absorbers, and antioxidants.

Suitable light stabilizers include, but are not limited to, TINUVIN® 292, TINUVIN® 328, TINUVIN® 213, TINUVIN® 765, TINUVIN® 770 and TINUVIN® 622. TINUVIN® products are available from Ciba Specialty Chemicals of Tarrytown, N.Y. In one embodiment, the light stabilizer is UV absorber TINUVIN® 328, which is useful with aromatic compounds. In another embodiment, hindered amine light stabilizer TINUVIN® 765 is used with aromatic or aliphatic compounds. In addition, TINUVIN® 292 may also be used with the aromatic or aliphatic compositions of the invention.

In addition, as discussed above, dyes, as well as optical brighteners and fluorescent pigments may also be included in the golf ball covers produced with polymers formed according to the present invention. For example, white dispersions may be added to a cover formulation containing aromatic components to combat the effects of discoloration due to the carbon-carbon double bonds. Such additional ingredients may be added in any amounts that will achieve their desired purpose.

Composition Blends

Other polymeric materials suitable for blending with the compositions of the invention include castable thermoplastics, cationic and anionic urethane ionomers and urethane epoxies, polyurethane ionomers, polyurea ionomers, epoxy resins, polyethylenes, polyamides and polyesters, polycarbonates, polyacrylin, siloxanes and epoxy resins or their blends, and mixtures thereof. One of ordinary skill in the art would be well aware of methods to blend the polymeric materials with the composition of the invention.

Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673, the entire disclosure of which is incorporated by reference herein. Examples of suitable polyureas used to form the polyurea ionomer listed above are discussed in U.S. Pat. No. 5,484,870. In particular, the polyureas of U.S. Pat. No. 5,484,870 are prepared by reacting a polyisocyanate and a polyamine curing agent to yield polyurea, which are distinct from the polyureas of the present invention which are formed from a polyurea prepolymer and curing agent. Examples of suitable polyurethanes cured with epoxy group containing curing agents are disclosed in U.S. Pat. No. 5,908,358. The disclosures of the above patents are incorporated herein by reference in their entirety.

Acid Functionalization of Compositions

The compositions of the invention may also be acid functionalized to improve adhesion to other components or layers as disclosed in U.S. Pat. No. 6,610,812, which is incorporated by reference herein in its entirety. The acid functional group is preferably based on a sulfonic group ($HSO_3$), carboxylic group ($HCO_2$), phosphoric acid group (H$_2$PO$_3$), or a combination thereof. More than one type of acid functional group may be incorporated into the composition. In one embodiment, the acid functionality is achieved by incorporating the acid group(s) into the isocyanate-containing component or the isocyanate-reactive component. For example, the isocyanate-containing component and an acid functional group containing compound, such as those described in U.S. Pat. Nos. 4,956,438 and 5,071,578, the disclosures of which are incorporated herein by reference in their entirety, may be reacted prior to forming the prepolymer.

The acid group(s) may also be incorporated during a post-polymerization reaction, wherein the acid functional group(s) is introduced or attached to the cured polyurea or polyurea-polyurethane. Moreover, the acid functional polyurea or polyurea-polyurethanes made by way of copolymerization as described above may be further incorporated with additional acid functional groups through such post-polymerization reactions. Suitable agents to incorporate acid functional groups onto the polyurea or polyurethane and methods for making are described in U.S. Pat. No. 6,207,784, the entire disclosure of which is incorporated by reference herein.

One of ordinary skill in the art would be aware of other ways to prepare the acid functional polyurea or polyurethane. For example, a combination of the embodiments described above may be used as described in U.S. Pat. No. 5,661,207, the disclosure of which is incorporated by reference in its entirety herein.

Golf Ball Construction

Golf Ball Core Layer(s)

The cores of the golf balls formed according to the invention may be solid, semi-solid, hollow, fluid-filled or powder-filled, one-piece or multi-component cores. The term "semi-solid" as used herein refers to a paste, a gel, or the like. Any core material known to one of ordinary skill in that art is suitable for use in the golf balls of the invention. Suitable core materials include thermoset materials, such as rubber, styrene butadiene, polybutadiene, isoprene, polyisoprene, trans-isoprene, as well as thermoplastics such as ionomer resins, polyamides or polyesters, and thermoplastic and thermoset polyurethane elastomers. As mentioned above, the compositions of the present invention may be used to form a core of a golf ball.

In the alternative, the golf ball core is formed from a composition including a base rubber (natural, synthetic, or a combination thereof), a crosslinking agent, and a filler. In another embodiment, the golf ball core is formed from a reaction product that includes a cis-to-trans catalyst, a resilient polymer component having polybutadiene, a free radical source, and optionally, a crosslinking agent, a filler, or both. Various combinations of polymers, cis-to-trans catalysts, fillers, crosslinkers, and a source of free radicals, such as those disclosed in co-pending and co-assigned U.S. Pat. No. 6,998,445, the entire disclosure of which is incorporated by reference herein, may be used to form the reaction product. Although this polybutadiene reaction product is discussed in a section pertaining to core compositions, the present invention also contemplates the use of the reaction product to form at least a portion of any component of a golf ball.

As used herein, the terms core and center are generally used interchangeably to reference the innermost component of the ball. In some embodiments, however, the term "center" is used when there are multiple core layers, i.e., a center and an outer core layer.

To obtain a higher resilience and lower compression, a high-molecular weight polybutadiene with a cis-isomer content preferably greater than about 40 percent is converted to increase the percentage of trans-isomer content at any point in the golf ball or portion thereof. In one embodiment, the cis-isomer is present in an amount of greater than about 70 percent, preferably greater than about 80 percent, and more preferably greater than about 90 percent of the total polybutadiene content. In still another embodiment, the cis-isomer is present in an amount of greater than about 95 percent, and more preferably greater than about 96 percent, of the total polybutadiene content.

A low amount of 1,2-polybutadiene isomer ("vinyl-polybutadiene") is desired in the initial polybutadiene, and the reaction product. In one embodiment, the vinyl polybutadiene isomer content is less than about 7 percent, preferably less than about 4 percent, and more preferably less than about 2 percent.

The polybutadiene material may have an absolute molecular weight of greater than about 200,000. In one embodiment, the polybutadiene molecular weight is greater than about 250,000, and more preferably from about 300,000 to 500,000. In another embodiment, the polybutadiene molecular weight is about 400,000 or greater. It is preferred that the polydispersity of the material is no greater than about 2, more preferably no greater than 1.8, and even more preferably no greater than 1.6.

In one embodiment, the polybutadiene has a Mooney viscosity greater than about 20, preferably greater than about 30, and more preferably greater than about 40. Mooney viscosity is typically measured according to ASTM D-1646. In another embodiment, the Mooney viscosity of the polybutadiene is greater than about 35, and preferably greater than about 50. In yet another embodiment, the Mooney viscosity is about 120 or less. For example, the Mooney viscosity of the unvulcanized polybutadiene may be from about 40 to about 120. In one embodiment, the Mooney viscosity is about 40 to about 80. In another embodiment, the Mooney viscosity is from about 45 to about 60, more preferably from about 45 to about 55.

In one embodiment, the center composition includes at least one rubber material having a resilience index of at least about 40. In another embodiment, the resilience index of the at least one rubber material is at least about 50.

Examples of desirable polybutadiene rubbers include BUNA® CB22 and BUNA® CB23, commercially available from Bayer of Akron, Ohio; UBEPOL® 360L and UBEPOL® 150L, commercially available from UBE Industries of Tokyo, Japan; CARIFLEX® BCP820, CARIFLEX® BCP824, CARIFLEX® BR1220, commercially available from Shell of Houston, Tex.; and KINEX®7245 and KINEX® 7665, commercially available from Goodyear of Akron, Ohio. If desired, the polybutadiene can also be mixed with other elastomers known in the art such as natural rubber, polyisoprene rubber and/or styrene-butadiene rubber in order to modify the properties of the core.

Without being bound by any particular theory, it is believed that the cis-to-trans catalyst component, in conjunction with the free radical source, acts to convert a percentage of the polybutadiene polymer component from the cis- to the trans-conformation. Thus, the cis-to-trans conversion preferably includes the presence of a cis-to-trans catalyst, such as an organosulfur or metal-containing organosulfur compound, a substituted or unsubstituted aromatic organic compound that does not contain sulfur or metal, an inorganic sulfide compound, an aromatic organometallic compound, or mixtures thereof.

As used herein, "cis-to-trans catalyst" means any component or a combination thereof that will convert at least a portion of cis-isomer to trans-isomer at a given temperature. The cis-to-trans catalyst component may include one or more cis-to-trans catalysts described herein, but typically includes at least one organosulfur component, a Group VIA component, an inorganic sulfide, or a combination thereof. In one embodiment, the cis-to-trans catalyst is a blend of an organosulfur component and an inorganic sulfide component or a Group VIA component.

As used herein when referring to the invention, the term "organosulfur compound(s)" or "organosulfur component(s)," refers to any compound containing carbon, hydrogen, and sulfur. As used herein, the term "sulfur component" means a component that is elemental sulfur, polymeric sulfur, or a combination thereof. It should be further understood that "elemental sulfur" refers to the ring structure of $S_8$ and that "polymeric sulfur" is a structure including at least one additional sulfur relative to the elemental sulfur.

The cis-to-trans catalyst is typically present in an amount sufficient to produce the reaction product so as to increase the trans-polybutadiene isomer content to contain from about 5 percent to 70 percent trans-isomer polybutadiene based on the total resilient polymer component. It is preferred that the cis-to-trans catalyst is present in an amount sufficient to increase the trans-polybutadiene isomer content at least about 15 percent, more preferably at least about 20 percent, and even more preferably at least about 25 percent.

Therefore, the cis-to-trans catalyst is preferably present in an amount from about 0.1 to about 25 parts per hundred of the total resilient polymer component. As used herein, the term "parts per hundred", also known as "pph", is defined as the number of parts by weight of a particular component present in a mixture, relative to 100 parts by weight of the total polymer component. Mathematically, this can be expressed as the weight of an ingredient divided by the total weight of the polymer, multiplied by a factor of 100. In one embodiment, the cis-to-trans catalyst is present in an amount from about 0.1 to about 12 pph of the total resilient polymer component. In another embodiment, the cis-to-trans catalyst is present in an amount from about 0.1 to about 10 pph of the total resilient polymer component. In yet another embodiment, the cis-to-trans catalyst is present in an amount from about 0.1 to about 8 pph of the total resilient polymer component. In still another embodiment, the cis-to-trans catalyst is present in an amount from about 0.1 to about 5 pph of the total resilient polymer component. The lower end of the ranges stated above also may be increased if it is determined that 0.1 pph does not provide the desired amount of conversion. For instance, the amount of the cis-to-trans catalyst is present may be about 0.5 or more, 0.75 or more, 1.0 or more, or even 1.5 or more.

Suitable organosulfur components for use in the invention include, but are not limited to, at least one of diphenyl disulfide; 4,4'-ditolyl disulfide; 2,2'-benzamido diphenyl disulfide; bis(2-aminophenyl)disulfide; bis(4-aminophenyl)disulfide; bis(3-aminophenyl)disulfide; 2,2'-bis(4-aminonaphthyl)disulfide; 2,2'-bis(3-aminonaphthyl)disulfide; 2,2'-bis(4-aminonaphthyl)disulfide; 2,2'-bis(5-aminonaphthyl)disulfide; 2,2'-bis(6-aminonaphthyl)disulfide; 2,2'-bis(7-aminonaphthyl)disulfide; 2,2'-bis(8-aminonaphthyl)disulfide; 1,1'-bis(2-aminonaphthyl)disulfide; 1,1'-bis(3-aminonaphthyl)disulfide; 1,1'-bis(3-aminonaphthyl)disulfide; 1,1'-bis(4-aminonaphthyl)disulfide; 1,1'-bis(5-aminonaphthyl)disulfide; 1,1'-bis(6-aminonaphthyl)disulfide; 1,1'-bis(7-aminonaphthyl)disulfide; 1,1'-bis(8-aminonaphthyl)disulfide; 1,2'-diamino-1,2'-dithiodinaphthalene; 2,3'-diamino-1,2'-dithiodinaphthalene; bis(4-chlorophenyl)disulfide; bis(2-chlorophenyl)disulfide; bis(3-chlorophenyl)disulfide; bis(4-bromophenyl)disulfide; bis(2-bromophenyl)disulfide; bis(3-bromophenyl)disulfide; bis(4-fluorophenyl)disulfide; bis(4-iodophenyl)disulfide; bis(2,5-dichlorophenyl)disulfide; bis(3,5-dichlorophenyl)disulfide; bis(2,4-dichlorophenyl)disulfide; bis(2,6-dichlorophenyl)disulfide; bis(2,5-dibromophenyl)disulfide; bis(3,5-dibromophenyl)disulfide; bis(2-chloro-5-bromophenyl) disulfide; bis(2,4,6-trichlorophenyl)disulfide; bis(2,3,4,5,6-pentachlorophenyl)disulfide; bis(4-cyanophenyl)disulfide; bis(2-cyanophenyl)disulfide; bis(4-nitrophenyl)disulfide; bis(2-nitrophenyl)disulfide; 2,2'-dithiobenzoic ethyl; 2,2'-dithiobenzoic methyl; 2,2'-dithiobenzoic acid; 4,4'-dithiobenzoic ethyl; bis(4-acetylphenyl)disulfide; bis(2-acetylphenyl)disulfide; bis(4-formylphenyl)disulfide; bis(4-carbamoylphenyl)disulfide; 1,1'-dinaphthyl disulfide; 2,2'-dinaphthyl disulfide; 1,2'-dinaphthyl disulfide; 2,2'-bis(1-chlorodinaphthyl)disulfide; 2,2'-bis(1-bromonaphthyl) disulfide; 1,1'-bis(2-chloronaphthyl)disulfide; 2,2'-bis(1-cyanonaphtyl)disulfide; 2,2'-bis(1-acetylnaphthyl)disulfide; and the like; or a mixture thereof. Most preferred organosulfur components include diphenyl disulfide, 4,4'-ditolyl disulfide, or a mixture thereof, especially 4,4'-ditolyl disulfide. In one embodiment, the at least one organosulfur component is substantially free of metal. As used herein, the term "substantially free of metal" means less than about 10 weight percent, preferably less than about 5 weight percent, more preferably less than about 3 weight percent, even more preferably less than about 1 weight percent, and most preferably less than about 0.01 weight percent. Suitable substituted or unsubstituted aromatic organic components that do not include sulfur or a metal include, but are not limited to, diphenyl acetylene, azobenzene, or a mixture thereof. The aromatic organic group preferably ranges in size from $C_6$ to $C_{20}$, and more preferably from $C_6$ to $C_{10}$.

In one embodiment, the organosulfur cis-to-trans catalyst is present in the reaction product in an amount from about 0.5 pph or greater. In another embodiment, the cis-to-trans catalyst including a organosulfur component is present in the reaction product in an amount from about 0.6 pph or greater. In yet another embodiment, the cis-to-trans catalyst including a organo sulfur component is present in the reaction product in an amount from about 1.0 pph or greater. In still another embodiment, the cis-to-trans catalyst including a organosulfur component is present in the reaction product in an amount from about 2.0 pph or greater.

Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof. In one embodiment, the metal-containing organosulfur cis-to-trans catalyst is present in the reaction product in an amount from about 1.0 pph or greater. In another embodiment, the cis-to-trans catalyst including a Group VIA component is present in the reaction product in an amount from about 2.0 pph or greater. In yet another embodiment, the cis-to-trans catalyst including a Group VIA component is present in the reaction product in an amount from about 2.5 pph or greater. In still another embodiment, the cis-to-trans catalyst including a Group VIA component is present in the reaction product in an amount from about 3.0 pph or greater.

The organosulfur component may also be an halogenated organosulfur compound. Halogenated organosulfur compounds include, but are not limited to those having the following general formula:

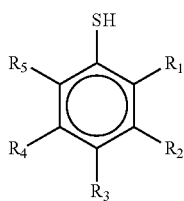

where $R_1$-$R_5$ can be $C_1$-$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their metal salts, e.g., zinc, magnesium, lithium, calcium, potassium, manganese, nickel, and the like. Preferably, the halogenated organosulfur compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated organosulfur compound is the zinc salt of pentachlorothiophenol, which is commercially available from eChinachem of San Francisco, Calif. The halogenated organosulfur compounds of the present invention are preferably present in an amount greater than about 2.2 pph, more preferably between about 2.3 pph and about 5 pph, and most preferably between about 2.3 and about 4 pph.

The cis-to-trans catalyst may also include a Group VIA component. As used herein, the terms "Group VIA component" or "Group VIA element" mean a component that includes a sulfur component, selenium, tellurium, or a combination thereof. Elemental sulfur and polymeric sulfur are commercially available from, e.g., Elastochem, Inc. of Chardon, Ohio. Exemplary sulfur catalyst compounds include PB(RM-S)-80 elemental sulfur and PB(CRST)-65 polymeric sulfur, each of which is available from Elastochem, Inc. An exemplary tellurium catalyst under the tradename TELLOY and an exemplary selenium catalyst under the tradename VANDEX are each commercially available from RT Vanderbilt of Norwalk, Conn.

In one embodiment, the cis-to-trans catalyst including a Group VIA component is present in the reaction product in an amount from about 0.25 pph or greater. In another embodiment, the cis-to-trans catalyst including a Group VIA component is present in the reaction product in an amount from about 0.5 pph or greater. In yet another embodiment, the cis-to-trans catalyst including a Group VIA component is present in the reaction product in an amount from about 1.0 pph or greater.

Suitable inorganic sulfide components include, but are not limited to titanium sulfide, manganese sulfide, and sulfide analogs of iron, calcium, cobalt, molybdenum, tungsten, copper, selenium, yttrium, zinc, tin, and bismuth. In one embodiment, the cis-to-trans catalyst including an inorganic sulfide component is present in the reaction product in an amount from about 0.5 pph or greater. In another embodiment, the cis-to-trans catalyst including a Group VIA component is present in the reaction product in an amount from about 0.75 pph or greater. In yet another embodiment, the cis-to-trans catalyst including a Group VIA component is present in the reaction product in an amount from about 1.0 pph or greater. When a reaction product includes a blend of cis-to-trans catalysts including an organosulfur component and an inorganic sulfide component, the organosulfur component is preferably present in an amount from about 0.5 or greater, preferably 1.0 or greater, and more preferably about 1.5 or greater and the inorganic sulfide component is preferably present in an amount from about 0.5 pph or greater, preferably 0.75 pph or greater, and more preferably about 1.0 pph or greater.

A substituted or unsubstituted aromatic organic compound may also be included in the cis-to-trans catalyst. In one embodiment, the aromatic organic compound is substantially free of metal. Suitable substituted or unsubstituted aromatic organic components include, but are not limited to, components having the formula $(R_1)_x$—$R_3$-M-$R_4$—$(R_2)_y$, wherein $R_1$ and $R_2$ are each hydrogen or a substituted or unsubstituted $C_{1-20}$ linear, branched, or cyclic alkyl, alkoxy, or alkylthio group, or a single, multiple, or fused ring $C_6$ to $C_{24}$ aromatic group; x and y are each an integer from 0 to 5; $R_3$ and $R_4$ are each selected from a single, multiple, or fused ring $C_6$ to $C_{24}$ aromatic group; and M includes an azo group or a metal component. $R_3$ and $R_4$ are each preferably selected from a $C_6$ to $C_{10}$ aromatic group, more preferably selected from phenyl, benzyl, naphthyl, benzamido, and benzothiazyl. $R_1$ and $R_2$ are each preferably selected from a substituted or unsubstituted $C_{1-10}$ linear, branched, or cyclic alkyl, alkoxy, or alkylthio group or a $C_6$ to $C_{10}$ aromatic group. When $R_1$, $R_2$, $R_3$, or $R_4$, are substituted, the substitution may include one or more of the following substituent groups: hydroxy and metal salts thereof; mercapto and metal salts thereof; halogen; amino, nitro, cyano, and amido; carboxyl including esters, acids, and metal salts thereof; silyl; acrylates and metal salts thereof; sulfonyl or sulfonamide; and phosphates and phosphites. When M is a metal component, it may be any suitable elemental metal available to those of ordinary skill in the art. Typically, the metal will be a transition metal, although preferably it is tellurium or selenium.

A free-radical source, often alternatively referred to as a free-radical initiator, is preferred in the rubber-based core composition. The free-radical source is typically a peroxide, and preferably an organic peroxide, which decomposes during the cure cycle. Suitable free-radical sources include organic peroxide compounds, such as di-t-amyl peroxide, di(2-t-butyl-peroxyisopropyl)benzene peroxide or,-bis(t-butylperoxy)diisopropylbenzene, 1,1-bis(t-butylperoxy)-3,3,5-trimethylcyclohexane or 1,1-di(t-butylperoxy) 3,3,5-trimethyl cyclohexane, dicumyl peroxide, di-t-butyl peroxide, 2,5-di-(t-butylperoxy)-2,5-dimethyl hexane, n-butyl-4,4-bis (t-butylperoxy)valerate, lauryl peroxide, benzoyl peroxide, t-butyl hydroperoxide, and the like, and any mixture thereof.

Other examples include, but are not limited to, VAROX® 231XL and Varox® DCP-R, commercially available from Elf Atochem of Philadelphia, Pa.; PERKADOX® BC and PERKADOX® 14, commercially available from Akzo Nobel of Chicago, Ill.; and ELASTOCHEM® DCP-70, commercially available from Rhein Chemie of Trenton, N.J. It is well known that peroxides are available in a variety of forms having different activity. The activity is typically defined by the "active oxygen content." For example, PERKADOX® BC peroxide is 98 percent active and has an active oxygen content of 5.8 percent, whereas PERKADOX® DCP-70 is 70 percent active and has an active oxygen content of 4.18 percent. The peroxide is may be present in an amount greater than about 0.1 parts per hundred of the total resilient polymer component, preferably about 0.1 to 15 parts per hundred of the resilient polymer component, and more preferably about 0.2 to 5 parts per hundred of the total resilient polymer component. If the peroxide is present in pure form, it is preferably present in an amount of at least about 0.25 pph, more preferably between about 0.35 pph and about 2.5 pph, and most preferably between about 0.5 pph and about 2 pph.

Peroxides are also available in concentrate form, which are well-known to have differing activities, as described above. In this case, if concentrate peroxides are employed in the present invention, one skilled in the art would know that the concentrations suitable for pure peroxides are easily adjusted for concentrate peroxides by dividing by the activity. For example, 2 pph of a pure peroxide is equivalent 4 pph of a concentrate peroxide that is 50 percent active (i.e., 2 divided by 0.5=4).

In one embodiment, the amount of free radical source is about 5 pph or less, but also may be about 3 pph or less. In another embodiment, the amount of free radical source is about 2.5 pph or less. In yet another embodiment, the amount of free radical source is about 2 pph or less. In still another embodiment, the amount of free radical source is about 1 pph or less preferably about 0.75 pph or less.

Those of ordinary skill in the art should understand that the presence of certain cis-to-trans catalysts according to the invention be more suited for a larger amount of free-radical source, such as the amounts described herein, compared to conventional cross-linking reactions. The free radical source may alternatively or additionally be one or more of an electron beam, UV or gamma radiation, x-rays, or any other high energy radiation source capable of generating free radicals. A skilled artisan is aware that heat often facilitates initiation of the generation of free radicals.

In one embodiment, the ratio of the free radical source to the cis-to-trans catalyst is about 10 or less, but also may be about 5 or less. Additionally, the ratio of the free radical source to the cis-to-trans catalyst may be from about 4 or less, but also may be about 2 or less, and also may be about 1 or less. In another embodiment, the ratio of the free radical source to the cis-to-trans catalyst is about 0.5 or less, preferably about 0.4 or less. In yet another embodiment, the free radical source cis-to-trans catalyst ratio is greater than about 1.0. In still another embodiment, the free radical source cis-to-trans catalyst is about 1.5 or greater, preferably about 1.75 or greater.

Crosslinkers may be included to increase the hardness of the reaction product. Suitable crosslinking agents include one or more metallic salts of unsaturated fatty acids having 3 to 8 carbon atoms, such as acrylic or methacrylic acid, or monocarboxylic acids, such as zinc, calcium, or magnesium acrylate salts, and the like, and mixtures thereof. Examples include, but are not limited to, one or more metal salt diacrylates, dimethacrylates, and monomethacrylates, wherein the metal is magnesium, calcium, zinc, aluminum, sodium, lithium, or nickel. Preferred acrylates include zinc acrylate, zinc diacrylate, zinc methacrylate, zinc dimethacrylate, and mixtures thereof. In one embodiment, zinc methacrylate is used in combination with the zinc salt of pentachlorothiophenol. The crosslinking agent must be present in an amount sufficient to crosslink a portion of the chains of polymers in the resilient polymer component. For example, the desired compression may be obtained by adjusting the amount of crosslinking. This may be achieved, for example, by altering the type and amount of crosslinking agent, a method well-known to those of ordinary skill in the art. The crosslinking agent is typically present in an amount greater than about 0.1 percent of the polymer component, preferably from about 10 to 50 percent of the polymer component, more preferably from about 10 to 40 percent of the polymer component.

In one embodiment, the crosslinking agent is present in an amount greater than about 10 parts per hundred ("pph") parts of the base polymer, preferably from about 20 to about 40 pph of the base polymer, more preferably from about 25 to about 35 pph of the base polymer. When an organosulfur is selected as the cis-to-trans catalyst, zinc diacrylate may be selected as the crosslinking agent and is present in an amount of less than about 25 pph.

It is to be understood that when elemental sulfur or polymeric sulfur is included in the cis-to-trans catalyst, an accelerator may be used to improve the performance of the cis-to-trans catalyst. Suitable accelerators include, but are not limited to, sulfenamide, such as N-oxydiethylene 2-benzothiazole-sulfenamide, thiazole, such as benzothiazyl disulfide, dithiocarbamate, such as bismuth dimethyldithiocarbamate, thiuram, such as tetrabenzyl thiuram disulfide, xanthate, such as zinc isopropyl xanthate, thiadiazine, thiourea, such as trimethylthiourea, guanadine, such as N,N'-di-ortho-tolylguanadine, or aldehyde-amine, such as a butyraldehyde-aniline condensation product, or mixtures thereof.

Typically, antioxidants are included in conventional golf ball core compositions because antioxidants are included in the materials supplied by manufacturers of compounds used in golf ball cores. Without being bound to any particular theory, higher amounts of antioxidant in the reaction product may result in less trans-isomer content because the antioxidants consume at least a portion of the free radical source. Thus, even with high amounts of the free radical source in the reaction product described previously, such as for example about 3 pph, an amount of antioxidant greater than about 0.3 pph may significantly reduce the effective amount of free radicals that are actually available to assist in a cis-to-trans conversion.

Because it is believed that the presence of antioxidants in the composition may inhibit the ability of free radicals to adequately assist in the cis-to-trans conversion, one way to ensure sufficient amounts of free radicals are provided for the conversion is to increase the initial levels of free radicals present in the composition so that sufficient amounts of free radicals remain after interaction with antioxidants in the composition. Thus, the initial amount of free radicals provided in the composition may be increased by at least about 10 percent, and more preferably are increased by at least about 25 percent so that the effective amount of remaining free radicals sufficient to adequately provide the desired cis-to-trans conversion. Depending on the amount of antioxidant present in the composition, the initial amount of free radicals may be increased by at least 50 percent, 100 percent, or an even greater amount as needed. As discussed below, selection of the amount of free radicals in the composition may be determined based on a desired ratio of free radicals to antioxidant.

Another approach is to reduce the levels of or eliminate antioxidants in the composition. For instance, the reaction product of the present invention may be substantially free of antioxidants, thereby achieving greater utilization of the free radicals toward the cis-to-trans conversion. As used herein, the term "substantially free" generally means that the polybutadiene reaction product includes less than about 0.3 pph of antioxidant, preferably less than about 0.1 pph of antioxidant, more preferably less than about 0.05 pph of antioxidant, and most preferably about 0.01 pph or less antioxidant.

The amount of antioxidant has been shown herein to have a relationship with the amount of trans-isomer content after conversion. For example, a polybutadiene reaction product with 0.5 pph of antioxidant cured at 335° F. for 11 minutes results in about 15 percent trans-isomer content at an exterior surface of the center and about 13.4 percent at an interior location after the conversion reaction. In contrast, the same polybutadiene reaction product substantially free of antioxidants results in about 32 percent trans-isomer content at an exterior surface and about 21.4 percent at an interior location after the conversion reaction.

In one embodiment, the ratio of the free radical source to antioxidant is greater than about 10. In another embodiment, the ratio of the free radical source to antioxidant is greater than about 25, preferably greater than about 50. In yet another embodiment, the free radical source-antioxidant ratio is about 100 or greater. In still another embodiment, the free radical source-antioxidant ratio is about 200 or greater, preferably 250 or greater, and more preferably about 300 or greater.

If the reaction product is substantially free of antioxidants, the amount of the free radical source is preferably about 3 pph or less. In one embodiment, the free radical source is present in an amount of about 2.5 pph or less, preferably about 2 pph or less. In yet another embodiment, the amount of the free radical source in the reaction product is about 1.5 pph or less, preferably about 1 pph or less. In still another embodiment, the free radical source is present is an amount of about 0.75 pph or less.

When the reaction product contains about 0.1 pph or greater antioxidant, the free radical source is preferably present in an amount of about 1 pph or greater. In one embodiment, when the reaction product has about 0.1 pph or greater antioxidant, the free radical source is present in an amount of about 2 pph or greater. In another embodiment, the free radical source is present in an amount of about 2.5 pph or greater when the antioxidant is present in an amount of about 0.1 pph or greater.

In one embodiment, when the reaction product contains greater than about 0.05 pph of antioxidant, the free radical source is preferably present in an amount of about 0.5 pph or greater. In another embodiment, when the reaction product has greater than about 0.05 pph of antioxidant, the free radical source is present in an amount of about 2 pph or greater. In yet another embodiment, the free radical source is present in an amount of about 2.5 pph or greater when the antioxidant is present in an amount of about 0.05 pph or greater.

Additional materials conventionally included in golf ball compositions may be added to rubber-based core compositions. These additional materials include, but are not limited to, density-adjusting fillers, coloring agents, reaction enhancers, crosslinking agents, whitening agents, UV absorbers, hindered amine light stabilizers, defoaming agents, processing aids, and other conventional additives. Stabilizers, softening agents, plasticizers, including internal and external plasticizers, impact modifiers, foaming agents, excipients, reinforcing materials and compatibilizers can also be added to any composition of the invention. All of these materials, which are well known in the art, are added for their usual purpose in typical amounts.

For example, the fillers discussed above with respect to the compositions of the invention may be added to the rubber-based core compositions to affect rheological and mixing properties, the specific gravity (i.e., density-modifying fillers), the modulus, the tear strength, reinforcement, and the like. Fillers may also be used to modify the weight of the core, e.g., a lower weight ball is preferred for a player having a low swing speed.

As discussed above, it may be preferable to convert cis-isomer to trans-isomer in polybutadiene core materials. Thus, in one embodiment, the amount of trans-isomer content after conversion is at least about 10 percent or greater, while in another it is about 12 percent or greater. In another embodiment, the amount of trans-isomer content is about 15 percent or greater after conversion. In yet another embodiment, the amount of trans-isomer content after conversion is about 20 percent or greater, and more preferably is about 25 percent or greater. In still another embodiment, the amount of trans-isomer content after conversion is about 30 percent or greater, and preferably is about 32 percent or greater. The amount of trans-isomer after conversion also may be about 35 percent or greater, about 38 percent or greater, or even about 40 percent or greater. In yet another embodiment, the amount of trans-isomer after conversion may be about 42 percent or greater, or even about 45 percent or greater.

The cured portion of the component including the reaction product of the invention may have a first amount of trans-isomer polybutadiene at an interior location and a second amount of trans-isomer polybutadiene at an exterior surface location. In one embodiment, the amount of trans-isomer at the exterior surface location is greater than the amount of trans-isomer at an interior location. As will be further illustrated by the examples provided herein, the difference in trans-isomer content between the exterior surface and the interior location after conversion may differ depending on the cure cycle and the ratios of materials used for the conversion reaction. For example, it is also possible that these differences can reflect a center with greater amounts of trans-isomer at the interior portion than at the exterior portion.

The exterior portion of the center may have amounts of trans-isomer after conversion in the amounts already indicated previously herein, such as in amounts about 10 percent or greater, about 12 percent or greater, about 15 percent or greater, and the like, up to and including amounts that are about 45 percent or greater as stated above. For example, in one embodiment of the invention, the polybutadiene reaction product may contain between about 35 percent to 60 percent of the trans-isomer at the exterior surface of a center portion. Another embodiment has from about 40 percent to 50 percent of trans-isomer at the exterior surface of a center portion. In one embodiment, the reaction product contains about 45 percent trans-isomer polybutadiene at the exterior surface of a center portion. In one embodiment, the reaction product at the center of the solid center portion may then contain at least about 20 percent less trans-isomer than is present at the exterior surface, preferably at least about 30 percent less trans-isomer, or at least about 40 percent less trans-isomer. In another embodiment, the amount of trans-isomer at the interior location is at least about 6 percent less than is present at the exterior surface, preferably at least about 10 percent less than the second amount.

The gradient between the interior portion of the center and the exterior portion of the center may vary. In one embodiment, the difference in trans-isomer content between the exterior and the interior after conversion is about 3 percent or greater, while in another embodiment the difference may be about 5 percent or greater. In another embodiment, the difference between the exterior surface and the interior location after conversion is about 10 percent or greater, and more preferably is about 20 percent or greater. In yet another embodiment, the difference in trans-isomer content between the exterior surface and the interior location after conversion may be about 5 percent or less, about 4 percent or less, and even about 3 percent or less. In yet another embodiment, the difference between the exterior surface and the interior location after conversion is less than about 1 percent.

The polybutadiene reaction product material preferably has a hardness of at least about 15 Shore A, more preferably between about 30 Shore A and 80 Shore D, and even more preferably between about 50 Shore A and 60 Shore D. In addition, the specific gravity is typically greater than about 0.7, preferably greater than about 1, for the golf ball polybutadiene material. Moreover, the polybutadiene reaction product preferably has a flexural modulus of from about 500 psi to 300,000 psi, preferably from about 2,000 to 200,000 psi.

The desired loss tangent in the polybutadiene reaction product should be less than about 0.15 at −60° C. and less than about 0.05 at 30° C. when measured at a frequency of 1 Hz and a 1 percent strain. In one embodiment, the polybutadiene reaction product material preferably has a loss tangent below about 0.1 at −50° C., and more preferably below about 0.07 at −50° C.

To produce golf balls having a desirable compressive stiffness, the dynamic stiffness of the polybutadiene reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

In one embodiment, the reaction product has a first dynamic stiffness measured at −50° C. that is less than about 130 percent of a second dynamic stiffness measured at 0° C. In another embodiment, the first dynamic stiffness is less than about 125 percent of the second dynamic stiffness. In yet another embodiment, the first dynamic stiffness is less than about 110 percent of the second dynamic stiffness.

Golf Ball Intermediate Layer(s)

When the golf ball of the present invention includes an intermediate layer, such as an inner cover layer or outer core layer, i.e., any layer(s) disposed between the inner core and the outer cover of a golf ball, this layer can include any materials known to those of ordinary skill in the art including thermoplastic and thermosetting materials. In one embodiment, the intermediate layer is formed, at least in part, from the composition of the invention.

The intermediate layer may also likewise include one or more homopolymeric or copolymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by Atofina Chemicals, Inc. of Philadelphia, Pa. and the thermoplastic compositions disclosed in U.S. Pat. No. 5,688,191, the entire disclosure of which is incorporated by reference herein;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

In one embodiment, the intermediate layer includes polymers, such as ethylene, propylene, butene-1 or hexene-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly (phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers, and blends thereof.

As briefly mentioned above, the intermediate layer may include ionomeric materials, such as ionic copolymers of ethylene and an unsaturated monocarboxylic acid, which are available under the trademark SURLYN® of E.I. DuPont de Nemours & Co., of Wilmington, Del., or IOTEK® or ESCOR® of Exxon. These are copolymers or terpolymers of ethylene and methacrylic acid or acrylic acid totally or partially neutralized, i.e., from about 1 to about 100 percent, with salts of zinc, sodium, lithium, magnesium, potassium, calcium, manganese, nickel or the like. In one embodiment, the carboxylic acid groups are neutralized from about 10 percent to about 100 percent. The carboxylic acid groups may also include methacrylic, crotonic, maleic, fumaric or itaconic acid. The salts are the reaction product of an olefin having from 2 to 10 carbon atoms and an unsaturated monocarboxylic acid having 3 to 8 carbon atoms.

The intermediate layer may also include at least one ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. In another embodiment, the acrylic or methacrylic acid is present in about 8 to 35 weight percent, more preferably 8 to 25 weight percent, and most preferably 8 to 20 weight percent.

The ionomer also may include so-called "low acid" and "high acid" ionomers, as well as blends thereof. In general, ionic copolymers including up to about 15 percent acid are considered "low acid" ionomers, while those including greater than about 15 percent acid are considered "high acid" ionomers. For example, U.S. Pat. Nos. 6,506,130 and 6,503,156 define low acid ionomers to include 16 weight percent or less acid content, whereas high acid ionomers are defined as containing greater than about 16 weight percent acid. In one embodiment, the intermediate layer is formed from a blend of low acid ionomers. For example, an ionomeric composition suitable for the intermediate layer may be formed from a low acid sodium ionomer and a low acid lithium ionomer with acid levels between about 13 percent and 16 percent.

A low acid ionomer is believed to impart high spin. Thus, in one embodiment, the intermediate layer includes a low acid ionomer where the acid is present in about 10 to 15 weight percent and optionally includes a softening comonomer, e.g., iso- or n-butylacrylate, to produce a softer terpolymer. The softening comonomer may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

In another embodiment, the intermediate layer includes at least one high acid ionomer, for low spin rate and maximum distance. In this aspect, the acrylic or methacrylic acid is present in about 15 to about 35 weight percent, making the ionomer a high modulus ionomer. In one embodiment, the high modulus ionomer includes about 16 percent by weight of a carboxylic acid, preferably from about 17 percent to about 25 percent by weight of a carboxylic acid, more preferably from about 18.5 percent to about 21.5 percent by weight of a carboxylic acid. In some circumstances, an additional comonomer such as an acrylate ester (i.e., iso- or n-butylacrylate, etc.) can also be included to produce a softer terpolymer. The additional comonomer may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high modulus ionomers include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like.

In one embodiment, the intermediate layer may be formed from at least one polymer containing $\alpha,\beta$-unsaturated carboxylic acid groups, or the salts thereof, that have been 100 percent neutralized by organic fatty acids. The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoleic, or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The acid moieties of the highly-neutralized polymers ("HNP"), typically ethylene-based ionomers, are preferably neutralized greater than about 70 percent, more preferably greater than about 90 percent, and most preferably at least about 100 percent. The HNP's may be also be blended with a second polymer component, which, if containing an acid group, may be neutralized in a conventional manner, by organic fatty acids, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like.

In this embodiment, the acid copolymers can be described as E/X/Y copolymers where E is ethylene, X is an $\alpha,\beta$-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

The organic acids are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoleic, or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized.

Examples of these materials are disclosed in U.S. Patent Application Publication Nos. 2001/0018375 and 2001/0019971, which are incorporated herein in their entirety by express reference thereto.

The ionomer compositions may also include at least one grafted metallocene catalyzed polymer. Blends of this embodiment may include about 1 pph to about 100 pph of at least one grafted metallocene catalyzed polymer and about 99 pph to 0 pph of at least one ionomer, preferably from about 5 pph to about 90 pph of at least one grafted metallocene catalyzed polymer and about 95 pph to about 10 pph of at least one ionomer, more preferably from about 10 pph to about 75 pph of at least one grafted metallocene catalyzed polymer and about 90 pph to about 25 pph of at least one ionomer, and most preferably from about 10 pph to about 50 pph of at least one grafted metallocene catalyzed polymer and about 90 pph to about 50 pph of at least one ionomer. Where the layer is foamed, the grafted metallocene catalyzed polymer blends may be foamed during molding by any conventional foaming or blowing agent.

In another embodiment, the intermediate layer includes at least one primarily or fully non-ionomeric thermoplastic material. Suitable non-ionomeric materials include polyamides and polyamide blends, grafted and non-grafted metallocene catalyzed polyolefins or polyamides, polyamide/ionomer blends, polyamide/nonionomer blends, polyphenylene ether/ionomer blends, and mixtures thereof. Examples of grafted and non-grafted metallocene catalyzed polyolefins or polyamides, polyamide/ionomer blends, polyamide/nonionomer blends are disclosed in co-pending U.S. Pat. No. 6,800,690, the entire disclosure of which is incorporated by reference herein.

In one embodiment, polyamide homopolymers, such as polyamide 6,18 and polyamide 6,36 are used alone, or in combination with other polyamide homopolymers. In another embodiment, polyamide copolymers, such as polyamide 6,10/6,36, are used alone, or in combination with other polyamide copolymers. Other examples of suitable polyamide homopolymers and copolymers include polyamide 4, polyamide 6, polyamide 7, polyamide 11, polyamide 12 (manufactured as Rilsan AMNO by Atofina Chemicals, Inc. of Philadelphia, Pa.), polyamide 13, polyamide 4,6, polyamide 6,6, polyamide 6,9, polyamide 6,10, polyamide 6,12, polyamide 6,36, polyamide 12,12, polyamide 13,13, polyamide 6/6,6, polyamide 6,6/6,10, polyamide 6/6,T wherein T represents terephthalic acid, polyamide 6/6,6/6,10, polyamide 6,10/6,36, polyamide 66,6,18, polyamide 66,6,36, polyamide 6/6,18, polyamide 6/6,36, polyamide 6/6,10/6,18, polyamide 6/6,10/6,36, polyamide 6,10/6,18, polyamide 6,12/6,18, polyamide 6,12/6,36, polyamide 6/66/6,18, polyamide 6/66/6,36, polyamide 66/6,10/ 6,18, polyamide 66/6,10/6,36, polyamide 6/6,12/6,18, polyamide 6/6,12/6,36, and mixtures thereof.

As mentioned above, any of the above polyamide homopolymer, copolymer, and homopolymer/copolymer blends may be optionally blended with ionomers, nonionomer polymers, such as nonionomer thermoplastic polymers, nonionomer thermoplastic copolymers, nonionomer TPEs, and mixtures thereof.

One specific example of a polyamide-nonionomer blend is a polyamide-metallocene catalyzed polymer blend. The blended compositions may include grafted and/or non-grafted metallocene catalyzed polymers. Grafted metallocene catalyzed polymers, functionalized with pendant groups, such as maleic anhydride, and the like, are available in experimental quantities from DuPont. Grafted metallocene catalyzed polymers may also be obtained by subjecting a commercially available non-grafted metallocene catalyzed polymer to a post-polymerization reaction involving a monomer and an organic peroxide to provide a grafted metallocene catalyzed polymer with the desired pendant group or groups.

Another example of a polyamide-nonionomer blend is a polyamide and non-ionic polymers produced using non-metallocene single-site catalysts. As used herein, the term "non-metallocene catalyst" or non-metallocene single-site catalyst" refers to a single-site catalyst other than a metallocene catalyst. Examples of suitable single-site catalyzed polymers are disclosed in co-pending U.S. patent application Ser. No. 09/677,871, of which the entire disclosure is incorporated by reference herein.

Nonionomers suitable for blending with the polyamide include, but are not limited to, block copoly(ester) copolymers, block copoly(amide) copolymers, block copoly(urethane) copolymers, styrene-based block copolymers, thermoplastic and elastomer blends wherein the elastomer is not vulcanized (TEB), and thermoplastic and elastomer or rubber blends wherein the elastomer is dynamically vulcanized (TED). Other nonionomers suitable for blending with polyamide to form an intermediate layer composition include, but are not limited to, polycarbonate, polyphenylene oxide, imidized, amino group containing polymers, high impact polystyrene (HIPS), polyether ketone, polysulfone, poly(phenylene sulfide), reinforced engineering plastics, acrylic-styrene-acrylonitrile, poly(tetrafluoroethylene), poly(butyl acrylate), poly(4-cyanobutyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(4-dodecylstyrene), poly(4-tetradecylstyrene), poly(ethylene oxide), poly(oxymethylene), poly(silazane), poly(furan tetracarboxylic acid diimide), poly(acrylonitrile), poly(methylstyrene), silicones, as well as the classes of polymers to which they belong and their copolymers including functional comonomers, and blends thereof.

In one embodiment, the non-ionomeric materials have a hardness of about 60 Shore D or greater and a flexural modulus of about 30,000 psi or greater.

The intermediate layer may include a resilient polymer component, which is preferably used as the majority of polymer in the intermediate layer to impart resilience in the cured state, and a reinforcing polymer component as a blend. Resilient polymers suitable for use in the intermediate layer include polybutadiene, polyisoprene, styrene-butadiene, styrene-propylene-diene rubber, ethylene-propylene-diene (EPDM), mixtures thereof, and the like, preferably having a high molecular weight of at least about 50,000 to about 1,000,000. In one embodiment, the molecular weight is from about 250,000 to about 750,000, and more preferably from about 200,000 to about 400,000.

Golf Ball Cover(s)

The cover provides the interface between the ball and a club. Properties that are desirable for the cover are good moldability, high abrasion resistance, high impact resistance, high tear strength, high resilience, and good mold release, among others. The cover layer may be formed, at least in part, from the composition of the invention. In one embodiment, the compositions of the invention may be used to form at least one cover layer of a golf ball of the present invention. For example, the cover layer may be formed with the reaction product of an isocyanate-containing component and an isocyanate-reactive component, which may be cured with a curing agent. In one embodiment, the cover layer is formed from a composition of the invention including a prepolymer of an aromatic diisocyanate and a polyol having between about 5 percent and 7 percent free NCO that has been cured with a polyether diol.

The cover compositions may also be formed from or include one or more homopolymeric or copolymeric materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid, and copolymers and homopolymers produced using a single-site catalyst;

(3) Polyurethanes, thermoplastic or thermoset, saturated or unsaturated, aliphatic or aromatic, acid functionalized, such as those prepared from polyols or amines and diisocyanates or polyisocyanates and those disclosed in U.S. Pat. No. 5,334,673 and U.S. patent application Ser. No. 10/072,395;

(4) Polyureas, thermoplastic or thermoset, saturated or unsaturated, aliphatic or aromatic, acid functionalized, such as those disclosed in U.S. Pat. No. 5,484,870 and U.S. patent application Ser. No. 10/072,395;

(5) Polyamides, such as poly(hexamethylene adipamide) and others prepared from diamines and dibasic acids, as well as those from amino acids such as poly(caprolactam), reinforced polyamides, and blends of polyamides with ionomers, polyethylene, ethylene copolymers, ethyl-propylene-non-conjugated diene terpolymer, and the like;

(6) Acrylic resins and blends of these resins with poly vinyl chloride, elastomers, and the like;

(7) Thermoplastics, such as urethanes; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX, sold by Atofina Chemicals, Inc. of Philadelphia, Pa., or the thermoplastic compositions disclosed in U.S. Pat. No. 5,688,191;

(8) Polyphenylene oxide resins or blends of polyphenylene oxide with high impact polystyrene as sold under the trademark NORYL by General Electric Company of Pittsfield, Mass.;

(9) Thermoplastic polyesters, such as polyethylene terephthalate, polybutylene terephthalate, polyethylene terephthalate/glycol modified and elastomers sold under the trademarks HYTREL by E.I. DuPont de Nemours & Co. of Wilmington, Del., and LOMOD by General Electric Company of Pittsfield, Mass.;

(10) Ethylene, propylene, 1-butene or 1-hexene based homopolymers or copolymers including functional monomers, such as acrylic and methacrylic acid or fully or partially neutralized ionomer resins, and their blends, methyl acrylate, methyl methacrylate homopolymers and copolymers, low acid ionomers, high acid ionomers, and blends thereof;

(11) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(12) Blends of thermoplastic rubbers with polyethylene, propylene, polyacetal, nylon, polyesters, cellulose esters, and the like.

The cover may also be at least partially formed from the polybutadiene reaction product discussed above with respect to the core.

As discussed elsewhere herein, the composition may be molded onto the golf ball in any known manner, such as by casting, compression molding, injection molding, reaction injection molding, or the like. One skilled in the art would appreciate that the molding method used may be determined at least partially by the properties of the composition. For example, casting may be preferred when the material is thermoset, whereas compression molding or injection molding may be preferred for thermoplastic compositions.

Golf Ball Constructions

The compositions of the present invention may be used with any type of ball construction including, but not limited to, one-piece, two-piece, three-piece, and four-piece designs, a double core, a double cover, an intermediate layer(s), a multilayer core, and/or a multi-layer cover depending on the type of performance desired of the ball. That is, the compositions of the invention may be used in a core, intermediate layer, and/or cover of a golf ball, each of which may have a single layer or multiple layers. As used herein, the term "multilayer" means at least two layers.

As described above in the core section, a core may be a one-piece core or a multilayer core, both of which may be solid, semi-solid, hollow, fluid-filled, or powder-filled. A multilayer core is one that has an innermost component with an additional core layer or additional core layers disposed thereon.

In addition, when the golf ball of the present invention includes an intermediate layer, this layer may be incorporated with a single or multilayer cover, a single or multi-piece core, with both a single layer cover and core, or with both a multilayer cover and a multilayer core. The intermediate layer may be an inner cover layer or outer core layer, or any other layer(s) disposed between the inner core and the outer cover of a golf ball. As with the core, the intermediate layer may also include a plurality of layers. It will be appreciated that any number or type of intermediate layers may be used, as desired.

For example, FIG. 1 shows a golf ball 1 having a core 2, at least one intermediate layer 3, and a cover 4. In one embodiment, the golf ball of FIG. 1 represents a core 2 of polybutadiene reaction material or other conventional materials and a cover 4 including the composition of the invention. In another embodiment, the core 2 of FIG. 1 may be liquid where a hollow spherical core shell is liquid filled. The intermediate layer 3 may be formed of a conventional ionomer or the composition of the invention.

The intermediate layer may also be a tensioned elastomeric material wound around a solid, semi-solid, hollow, fluid-filled, or powder-filled center. As used herein, the term "fluid" refers to a liquid or gas and the term "semi-solid" refers to a paste, gel, or the like. A wound layer may be described as a core layer or an intermediate layer for the purposes of the invention. As an example, the golf ball 1 of FIG. 1 may include a core 2, a tensioned elastomeric layer 3 wound thereon, and a cover layer 4. In particular, the golf ball 1 of FIG. 1 may have a core 2 made of a polybutadiene reaction product, an intermediate layer including a tensioned elastomeric material 3 and cover 4 formed from the composition of the invention. In this aspect of the invention, the composition of the invention may be formed using an isocyanate-reactive component having a hydrophobic backbone to create a more water resistant golf ball. The tensioned elastomeric material may be formed of any suitable material known to those of ordinary skill in the art. In one embodiment, the composition of the invention is used to form the tensioned elastomeric material.

At least one layer of the ball may be a moisture barrier layer, such as the ones described in U.S. Pat. No. 5,820,488, which is incorporated by reference herein. Any suitable film-forming material having a lower water vapor transmission rate than the other layers between the core and the outer surface of the ball, i.e., cover, primer, and clear coat. Examples include, but are not limited to polyvinylidene chloride, vermiculite, and a polybutadiene reaction product with fluorine gas. In one embodiment, the moisture barrier layer has a water vapor transmission rate that is sufficiently low to reduce the loss of COR of the golf ball by at least 5 percent if the ball is stored at 100° F. and 70 percent relative humidity for six weeks as compared to the loss in COR of a golf ball that does not include the moisture barrier, has the same type of core and cover, and is stored under substantially identical conditions.

Prior to forming the cover layer, the inner ball, i.e., the core and any intermediate layers disposed thereon, may be surface treated to increase the adhesion between the outer surface of the inner ball and the cover. Examples of such surface treatment may include mechanically or chemically abrading the outer surface of the subassembly. Additionally, the inner ball may be subjected to corona discharge, plasma treatment, silane dipping, or other chemical treatment methods known to those of ordinary skill in the art prior to forming the cover around it. Other layers of the ball, e.g., the core and the cover layers, also may be surface treated. Examples of these and other surface treatment techniques can be found in U.S. Pat. No. 6,315,915, which is incorporated by reference in its entirety.

Figure 2:
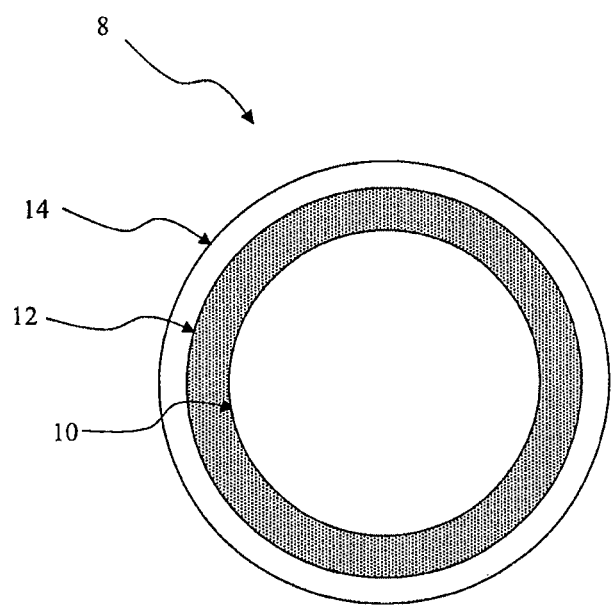
FIG. 2 is a cross-sectional view of a multi-component golf ball including a core, a thin inner cover layer, and a thin outer cover layer disposed thereon, wherein at least one layer is formed from a composition of the invention.

The core or cover may include a plurality of layers, e.g., an inner cover layer disposed about a golf ball center and an outer cover layer formed thereon. For example, FIG. 2 may represent a golf ball 5 having a core 6, an outer core layer or intermediate layer 7, a thin inner cover layer 8, and a thin outer cover layer 9 disposed thereon. In particular, the core 6 and intermediate layer 7 may be formed of a polybutadiene reaction material, the inner cover layer 8 formed of the composition of the invention or a conventional ionomeric material, and the outer cover layer 9 formed of the composition of the invention or a conventional cover material.

Figure 3:
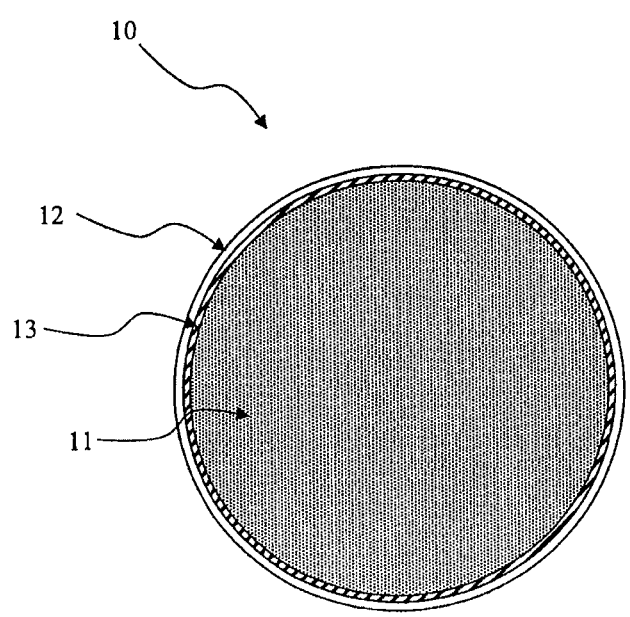
FIG. 3 is a cross-sectional view of two-piece ball including a large core and a cover, and an optional inner cover, wherein at least one component is formed from a composition of the invention.

Furthermore, the compositions of the invention may be used to form a golf ball 10, shown in FIG. 3, having a large core 11 and a thin outer cover layer 12. In one embodiment, the large core 11 is formed of a polybutadiene reaction material and the thin outer cover layer 12 is formed of the composition. In another embodiment, a thin inner cover layer 13 is added between the large core 11 and the thin outer cover layer 12.

While hardness gradients are typically used in a golf ball to achieve certain characteristics, the present invention also contemplates the compositions of the invention being used in a golf ball with multiple cover layers having essentially the same hardness, wherein at least one of the layers has been modified in some way to alter a property that affects the performance of the ball. Such ball constructions are disclosed in co-pending U.S. patent application Ser. No. 10/167,744, filed Jun. 13, 2002, entitled "Golf Ball with Multiple Cover Layers," the entire disclosure of which is incorporated by reference herein.

In one such embodiment, both covers layers can be formed of the same material and have essentially the same hardness, but the layers are designed to have different coefficient of friction values. In another embodiment, the compositions of the invention are used in a golf ball with multiple cover layers having essentially the same hardness, but different rheological properties under high deformation. Another aspect of this embodiment relates to a golf ball with multiple cover layers having essentially the same hardness, but different thicknesses to simulate a soft outer cover over hard inner cover ball.

In another aspect of this concept, the cover layers of a golf ball have essentially the same hardness, but different properties at high or low temperatures as compared to ambient temperatures. In particular, this aspect of the invention is directed to a golf ball having multiple cover layers wherein the outer cover layer composition has a lower flexural modulus at reduced temperatures than the inner cover layer, while the layers retain the same hardness at ambient and reduced temperatures, which results in a simulated soft outer cover layer over a hard inner cover layer feel. Certain polyureas may have a much more stable flexural modulus at different temperatures than ionomer resins and thus, could be used to make an effectively "softer" layer at lower temperatures than at ambient or elevated temperatures.

Yet another aspect of this concept relates to a golf ball with multiple cover layers having essentially the same hardness, but different properties under wet conditions as compared to dry conditions. Wettability of a golf ball layer may be affected by surface roughness, chemical heterogeneity, molecular orientation, swelling, and interfacial tensions, among others. Thus, non-destructive surface treatments of a golf ball layer may aid in increasing the hydrophilicity of a layer, while highly polishing or smoothing the surface of a golf ball layer may decrease wettability. U.S. Pat. Nos. 5,403,453 and 5,456,972 disclose methods of surface treating polymer materials to affect the wettability, the entire disclosures of which are incorporated by reference herein. In addition, plasma etching, corona treating, and flame treating may be useful surface treatments to alter the wettability to desired conditions. Wetting agents may also be added to the golf ball layer composition to modify the surface tension of the layer.

Thus, the differences in wettability of the cover layers according to the invention may be measured by a difference in contact angle. The contact angles for a layer may be from about 1° (low wettability) to about 180° (very high wettability). In one embodiment, the cover layers have contact angles that vary by about 1° or greater. In another embodiment, the contact angles of the cover layer vary by about 3° or greater. In yet another embodiment, the contact angles of the cover layers vary by about 5° or greater.

Other non-limiting examples of suitable types of ball constructions that may be used with the present invention include those described in U.S. Pat. Nos. 6,056,842, 5,688,191, 5,713,801, 5,803,831, 5,885,172, 5,919,100, 5,965,669, 5,981,654, 5,981,658, and 6,149,535, as well as in Publication Nos. US2001/0009310 A1, US2002/0025862, and US2002/0028885. The entire disclosures of these patents and published patent applications are incorporated by reference herein.

Forming the Layers

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. A method of injection molding using a split vent pin can be found in U.S. Pat. No. 6,877,974. Examples of retractable pin injection molding may be found in U.S. Pat. Nos. 6,129,881, 6,235,230, and 6,379,138. These molding references are incorporated in their entirety by reference herein.

One skilled in the art would appreciate that the molding method used may be determined at least partially by the properties of the composition. For example, casting, RIM, or LIM may be preferred when the material is thermoset, whereas compression molding or injection molding may be preferred for thermoplastic compositions. Compression molding, however, may also be used for thermoset inner ball materials. For example, when cores are formed from a thermoset material, compression molding is a particularly suitable method of forming the core, whereas when the cores are formed of a thermoplastic material, the cores may be injection molded. In addition, the intermediate layer may also be formed from using any suitable method known to those of ordinary skill in the art. For example, an intermediate layer may be formed by blow molding and covered with a dimpled cover layer formed by injection molding, compression molding, casting, vacuum forming, powder coating, and the like.

In addition, when layers are formed of the compositions of the invention or other conventional polyurea and/or polyurethane compositions, these materials may be applied over an inner ball using a variety of application techniques such as spraying, compression molding, dipping, spin coating, casting, or flow coating methods that are well known in the art. Examples of forming polyurea and polyurethane materials about an inner ball are disclosed in U.S. Pat. Nos. 5,733,428, 5,006,297, and 5,334,673, which are incorporated by reference in their entirety herein. In one embodiment, a combination of casting and compression molding can be used to form a polyurethane or polyurea composition over an inner ball. However, the method of forming covers according to the invention is not limited to the use of these techniques; other methods known to those skilled in the art may also be employed.

Prior to forming the cover layer, the inner ball, i.e., the core and any intermediate layers disposed thereon, may be surface treated to further increase the adhesion between the outer surface of the inner ball and the cover. Examples of such surface treatment may include mechanically or chemically abrading the outer surface of the subassembly. Additionally, the inner ball may be subjected to corona discharge, plasma treatment, and/or silane dipping prior to forming the cover around it. Other layers of the ball, e.g., the core, also may be surface treated. Examples of these and other surface treatment techniques can be found in U.S. Pat. No. 6,315,915, which is incorporated by reference in its entirety.

The methods discussed herein and other manufacturing methods for forming the golf ball components of the present invention are also disclosed in U.S. Pat. Nos. 6,207,784 and 5,484,870, the disclosures of which are incorporated herein by reference in their entirety.

Dimples

The golf balls of the invention are preferably designed with certain flight characteristics in mind. The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Alternatively, the dimple pattern can be arranged according to phyllotactic patterns, such as described in U.S. Pat. No. 6,338,684, which is incorporated herein in its entirety.

Dimple patterns may also be based on Archimedean patterns including a truncated octahedron, a great rhombcuboctahedron, a truncated dodecahedron, and a great rhombicosidodecahedron, wherein the pattern has a non-linear or staggered parting line, as disclosed in U.S. Pat. No. 6,705,959, which is incorporated in its entirety by reference herein. The golf balls of the present invention may also be covered with non-circular shaped dimples, i.e., amorphous shaped dimples, as disclosed in U.S. Pat. No. 6,409,615, which is incorporated in its entirety by reference herein.

Dimple patterns that provide a high percentage of surface coverage are preferred, and are well known in the art. For example, U.S. Pat. Nos. 5,562,552, 5,575,477, 5,957,787, 5,249,804, and 4,925,193 disclose geometric patterns for positioning dimples on a golf ball. In one embodiment, the golf balls of the invention have a dimple coverage of the surface area of the cover of at least about 60 percent, preferably at least about 65 percent, and more preferably at least 70 percent or greater. Dimple patterns having even higher dimple coverage values may also be used with the present invention. Thus, the golf balls of the present invention may have a dimple coverage of at least about 75 percent or greater, about 80 percent or greater, or even about 85 percent or greater.

In addition, a tubular lattice pattern, such as the one disclosed in U.S. Pat. No. 6,290,615, which is incorporated by reference in its entirety herein, may also be used with golf balls of the present invention. The golf balls of the present invention may also have a plurality of pyramidal projections disposed on the intermediate layer of the ball, as disclosed in U.S. Pat. No. 6,383,092, which is incorporated in its entirety by reference herein. The plurality of pyramidal projections on the golf ball may cover between about 20 percent to about 80 of the surface of the intermediate layer.

In an alternative embodiment, the golf ball may have a non-planar parting line allowing for some of the plurality of pyramidal projections to be disposed about the equator. Such a golf ball may be fabricated using a mold as disclosed in U.S. patent application Ser. No. 09/442,845, filed Nov. 18, 1999, entitled "Mold For A Golf Ball," and which is incorporated in its entirety by reference herein. This embodiment allows for greater uniformity of the pyramidal projections. Several additional non-limiting examples of dimple patterns with varying sizes of dimples are also provided in U.S. Pat. Nos. 6,358,161 and 6,213,898, the entire disclosures of which are incorporated by reference herein.

The total number of dimples on the ball, or dimple count, may vary depending such factors as the sizes of the dimples and the pattern selected. In general, the total number of dimples on the ball preferably is between about 100 to about 1000 dimples, although one skilled in the art would recognize that differing dimple counts within this range can significantly alter the flight performance of the ball. In one embodiment, the dimple count is about 380 dimples or greater, but more preferably is about 400 dimples or greater, and even more preferably is about 420 dimples or greater. In another embodiment, the dimple count on the ball is about 422 dimples. In some cases, it may be desirable to have fewer dimples on the ball. In this regard, the dimple count on the ball may range from about 240 to about 450, preferably about 252 to about 440.

Dimple profiles revolving a catenary curve about its symmetrical axis may increase aerodynamic efficiency, provide a convenient way to alter the dimples to adjust ball performance without changing the dimple pattern, and result in uniformly increased flight distance for golfers of all swing speeds. Thus, catenary curve dimple profiles, as disclosed in U.S. Pat. No. 6,796,912, which is incorporated in its entirety by reference herein, is contemplated for use with the golf balls of the present invention.

Golf Ball Post-Processing

The golf balls of the present invention may be painted, coated, or surface treated for further benefits. For example, a golf ball of the invention may be treated with a base resin paint composition or the cover composition may contain certain additives to achieve a desired color characteristic. In one embodiment, the golf ball cover composition contains a fluorescent whitening agent, e.g., a derivative of 7-triazinylamino-3-phenylcoumarin, to provide improved weather resistance and brightness. An example of such a fluorescent whitening agent is disclosed in U.S. Patent Publication No. 2002/0082358, which is incorporated by reference herein in its entirety.

Protective and decorative coating materials, as well as methods of applying such materials to the surface of a golf ball cover are well known in the golf ball art. Generally, such coating materials comprise urethanes, urethane hybrids, epoxies, polyesters and acrylics.

The coating layer(s) may be applied by any suitable method known to those of ordinary skill in the art. For example, the coating layer(s) may be applied to the golf ball cover by an in-mold coating process, such as described in U.S. Pat. No. 5,849,168, which is incorporated in its entirety by reference herein. In addition, the golf balls of the invention may be painted or coated with an ultraviolet curable/treatable ink, by using the methods and materials disclosed in U.S. Pat. Nos. 6,500,495, 6,248,804, and 6,099,415, the entire disclosures of which are incorporated by reference herein.

Any trademarks or other indicia that may be used with the present invention may be applied to the ball through a variety of methods known to those of skill in the golf ball manufacturing art. In one embodiment, the indicia is stamped, i.e., pad-printed, on the outer surface of the ball cover, and the stamped outer surface is then treated with at least one clear coat to give the ball a glossy finish and protect the indicia stamped on the cover. In another embodiment, the indicia is applied to the intended layer by ink-jet printing. And, if desired, more than one coating layer can be used.

Golf Ball Properties

The properties such as hardness, modulus, core diameter, intermediate layer thickness and cover layer thickness of the golf balls of the present invention have been found to effect play characteristics such as spin, initial velocity and feel of the present golf balls. For example, the flexural and/or tensile modulus of the intermediate layer are believed to have an effect on the "feel" of the golf balls of the present invention. It should be understood that the ranges herein are meant to be intermixed with each other, i.e., the low end of one range may be combined with a high end of another range.

Component Dimensions

Dimensions of golf ball components, i.e., thickness and diameter, may vary depending on the desired properties. For the purposes of the invention, any layer thickness may be employed. Non-limiting examples of the various embodiments outlined above are provided here with respect to layer dimensions.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used. Preferably, the overall diameter of the core and all intermediate layers is about 80 percent to about 98 percent of the overall diameter of the finished ball.

The core may have a diameter ranging from about 0.09 inches to about 1.65 inches. In one embodiment, the diameter of the core of the present invention is about 1.2 inches to about 1.630 inches. In another embodiment, the diameter of the core is about 1.3 inches to about 1.6 inches, preferably from about 1.39 inches to about 1.6 inches, and more preferably from about 1.5 inches to about 1.6 inches. In yet another embodiment, the core has a diameter of about 1.55 inches to about 1.65 inches.

The core of the golf ball may also be extremely large in relation to the rest of the ball. For example, in one embodiment, the core makes up about 90 percent to about 98 percent of the ball, preferably about 94 percent to about 96 percent of the ball. In this embodiment, the diameter of the core is preferably about 1.54 inches or greater, preferably about 1.55 inches or greater. In one embodiment, the core diameter is about 1.59 inches or greater. In another embodiment, the diameter of the core is about 1.64 inches or less.

When the core includes a center and an outer core layer, the center is preferably about 0.9 inches or greater and the outer core layer preferably has a thickness of about 0.1 inches or greater. In one embodiment, the center has a diameter from about 0.09 inches to about 1.2 inches and the outer core layer has a thickness from about 0.1 inches to about 0.8 inches. In yet another embodiment, the center diameter is from about 0.095 inches to about 1.1 inches and the outer core layer has a thickness of about 0.20 inches to about 0.03 inches.

If the composition of the invention is used as an outer core layer, the cured thickness of the layer is preferably about 0.001 inches to about 0.1 inches. In one embodiment, the outer core layer's cured thickness is about 0.002 inches to about 0.05 inches. In another embodiment, the cured thickness of the outer core layer is about 0.003 inches to about 0.03 inches.

The cover typically has a thickness to provide sufficient strength, good performance characteristics, and durability. In one embodiment, the cover thickness is from about 0.02 inches to about 0.35 inches. In another embodiment, the cover preferably has a thickness of about 0.02 inches to about 0.12 inches, preferably about 0.1 inches or less, more preferably about 0.07 inches or less. In yet another embodiment, the outer cover has a thickness from about 0.02 inches to about 0.07 inches. In still another embodiment, the cover thickness is about 0.05 inches or less, preferably from about 0.02 inches to about 0.05 inches. For example, the outer cover layer may be between about 0.02 inches and about 0.045 inches, preferably about 0.025 inches to about 0.04 inches thick. In one embodiment, the outer cover layer is about 0.03 inches thick.

The range of thicknesses for an intermediate layer of a golf ball is large because of the vast possibilities when using an intermediate layer, i.e., as an outer core layer, an inner cover layer, a wound layer, a moisture/vapor barrier layer. When used in a golf ball of the invention, the intermediate layer, or inner cover layer, may have a thickness about 0.3 inches or less. In one embodiment, the thickness of the intermediate layer is from about 0.002 inches to about 0.1 inches, preferably about 0.01 inches or greater. In one embodiment, the thickness of the intermediate layer is about 0.09 inches or less, preferably about 0.06 inches or less. In another embodiment, the intermediate layer thickness is about 0.05 inches or less, more preferably about 0.01 inches to about 0.045 inches. In one embodiment, the intermediate layer, thickness is about 0.02 inches to about 0.04 inches. In another embodiment, the intermediate layer thickness is from about 0.025 inches to about 0.035 inches. In yet another embodiment, the thickness of the intermediate layer is about 0.035 inches thick. In still another embodiment, the inner cover layer is from about 0.03 inches to about 0.035 inches thick. Varying combinations of these ranges of thickness for the intermediate and outer cover layers may be used in combination with other embodiments described herein.

The ratio of the thickness of the intermediate layer to the outer cover layer is preferably about 10 or less, preferably from about 3 or less. In another embodiment, the ratio of the thickness of the intermediate layer to the outer cover layer is about 1 or less. The core and intermediate layer(s) together form an inner ball preferably having a diameter of about 1.48 inches or greater for a 1.68-inch ball. In one embodiment, the inner ball of a 1.68-inch ball has a diameter of about 1.52 inches or greater. In another embodiment, the inner ball of a 1.68-inch ball has a diameter of about 1.66 inches or less. In yet another embodiment, a 1.72-inch (or more) ball has an inner ball diameter of about 1.50 inches or greater. In still another embodiment, the diameter of the inner ball for a 1.72-inch ball is about 1.70 inches or less.

Hardness

Most golf balls consist of layers having different hardnesses, e.g., hardness gradients, to achieve desired performance characteristics. The present invention contemplates golf balls having hardness gradients between layers, as well as those golf balls with layers having the same hardness.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. The material hardness of the compositions of the invention is addressed above.

Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other. As such, the hardness of a golf ball component formed from a composition of the invention may differ significantly from the material hardness of the composition. In this regard, while the composition of the invention may have a material hardness of about 8 Shore D to about 20 Shore D, a cover formed from a composition of the invention may range from about 30 Shore D to about 60 Shore D. In one embodiment, the material hardness is about 10 Shore D to about 14 Shore D and the cover hardness is about 40 Shore D to about 55 Shore D. In another embodiment, the material hardness is about 10 Shore D to about 12 Shore D and the cover hardness is less than about 50 Shore D.

The cores of the present invention may have varying hardnesses depending on the particular golf ball construction. In one embodiment, the core hardness is at least about 15 Shore A, preferably about 30 Shore A, as measured on a formed sphere. In another embodiment, the core has a hardness of about 50 Shore A to about 90 Shore D. In yet another embodiment, the hardness of the core is about 80 Shore D or less. Preferably, the core has a hardness about 30 to about 65 Shore D, and more preferably, the core has a hardness about 35 to about 60 Shore D.

The intermediate layer(s) of the present invention may also vary in hardness depending on the specific construction of the ball. In one embodiment, the hardness of the intermediate layer is about 30 Shore D or greater. In another embodiment, the hardness of the intermediate layer is about 90 Shore D or less, preferably about 80 Shore D or less, and more preferably about 70 Shore D or less. For example, in one embodiment, the intermediate layer may have a hardness of about 60 Shore D or less. In yet another embodiment, the hardness of the intermediate layer is about 50 Shore D or greater, preferably about 55 Shore D or greater. In one embodiment, the intermediate layer hardness is from about 55 Shore D to about 65 Shore D. The intermediate layer may also be about 65 Shore D or greater.

When the intermediate layer is intended to be harder than the core layer, the ratio of the intermediate layer hardness to the core hardness preferably about 2 or less. In one embodiment, the ratio is about 1.8 or less. In yet another embodiment, the ratio is about 1.3 or less.

As with the core and intermediate layers, the cover hardness may vary depending on the construction and desired characteristics of the golf ball. The ratio of cover hardness to inner ball hardness is a primary variable used to control the aerodynamics of a ball and, in particular, the spin of a ball. In general, the harder the inner ball, the greater the driver spin and the softer the cover, the greater the driver spin.

For example, when the intermediate layer is intended to be the hardest point in the ball, e.g., about 50 Shore D to about 75 Shore D, the cover material may have a hardness of about 30 Shore D or less, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

The cover hardness may also be defined in terms of Shore C. For example, the cover may have a hardness of about 90 Shore C or less, preferably about 80 Shore C or less. In another embodiment, the cover has a hardness of about 75 Shore C or less.

In this aspect of the invention, i.e., when the outer cover layer is softer than the intermediate layer or inner cover layer, the ratio of the Shore D hardness of the outer cover material to the intermediate layer material is about 0.9 or less, preferably about 0.85 or less, and more preferably about 0.83 or less.

In yet another embodiment, the ratio is about 0.1 or less when the cover and intermediate layer materials have hardnesses that are substantially the same. When the hardness differential between the cover layer and the intermediate layer is not intended to be as significant, the cover may have a hardness of about 55 Shore D to about 65 Shore D. In this embodiment, the ratio of the Shore D hardness of the outer cover to the intermediate layer is about 1.0 or less, preferably about 0.9 or less.

When a two-piece ball is constructed, the core is preferably harder than the cover. For example, the core hardness may range from about 40 Shore D to about 80 Shore D, and the cover hardness may be from about 30 Shore D to about 60 Shore D. In this type of construction, the ratio between the cover hardness and the core hardness is preferably about 1 or less. In another embodiment, the ratio is about 0.98 or less.

Compression

Compression values are dependent on the diameter of the component being measured. Atti compression is typically used to measure the compression of a golf ball. As used herein, the terms "Atti compression" or "compression" are defined as the deflection of an object or material relative to the deflection of a calibrated spring, as measured with an Atti Compression Gauge, that is commercially available from Atti Engineering Corp. of Union City, N.J.

The Atti compression of the core, or portion of the core, of golf balls prepared according to the invention is preferably less than about 100, more preferably less than about 95. In another embodiment, the core compression is from about 50 to about 100, preferably from about 60 to about 90. In yet another embodiment, the core compression is preferably greater than about 60, and more preferably greater than about 65.

In this aspect of the invention, the compression of the cores may also be measured according to the Soft Center Deflection Index ("SCDI"). The SCDI is a program change for the Dynamic Compression Machine ("DCM") that allows determination of the pounds required to deflect a core 10 percent of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test.

The SCDI is a slight variation of this set up. The hardware is the same, but the software and output has changed. With the SCDI, we are only interested in the pounds of force required to deflect a core time the amount of inches. That amount of deflection is 10 percent of the core diameter. The DCM is triggered, the cylinder deflects the core by 10 percent of its diameter, and the DCM reports back the pounds of force required (as measured from the attached load cell) to deflect the core by that amount. The value displayed is a single number in units of pounds.

The core should have an SCDI compression less than about 160. Preferably, the core has an SCDI compression between about 40 and about 160 and most preferably, the core has an SCDI compression between about 60 and about 120. In one embodiment, the core has an SCDI compression of about 65 or greater, preferably about 70 or greater.

The golf balls of the invention preferably have an Atti compression of about 55 or greater, preferably from about 60 to about 120. In another embodiment, the Atti compression of the golf balls of the invention is at least about 70, preferably from about 80 to about 115. For example, a preferred golf ball of the invention may have a compression from about 75 to about 90. In another embodiment, the compression of a dual core/dual cover golf ball formed according to the invention is about 90 to about 110, preferably about 95 to about 105.

Initial Velocity and COR

There is currently no USGA limit on the COR of a golf ball, but the initial velocity of the golf ball cannot exceed 250±5 feet/second (ft/s). Thus, in one embodiment, the initial velocity is about 245 ft/s or greater and about 255 ft/s or greater. In another embodiment, the initial velocity is about 250 ft/s or greater. In one embodiment, the initial velocity is about 253 ft/s to about 254 ft/s. In yet another embodiment, the initial velocity is about 255 ft/s. While the current rules on initial velocity require that golf ball manufacturers stay within the limit, one of ordinary skill in the art would appreciate that the golf ball of the invention would readily convert into a golf ball with initial velocity outside of this range. For example, a golf ball of the invention may be designed to have an initial velocity of about 220 ft/s or greater, preferably about 225 ft/s or greater.

As a result, of the initial velocity limitation set forth by the USGA, the goal is to maximize COR without violating the 255 ft/s limit. The COR of a ball is measured by taking the ratio of the outbound or rebound velocity to the incoming or inbound velocity. In a one-piece solid golf ball, the COR will depend on a variety of characteristics of the ball, including its composition and hardness. For a given composition, COR will generally increase as hardness is increased. In a two-piece solid golf ball, e.g., a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

The present invention contemplates golf balls having CORs from about 0.700 to about 0.850 at an inbound velocity of about 125 ft/sec. In one embodiment, the COR is about 0.750 or greater, preferably about 0.780 or greater. In another embodiment, the ball has a COR of greater than about 0.790. In yet another embodiment, the COR of balls made according to the invention is about 0.800 to about 0.815.

In addition, the inner ball preferably has a COR of about 0.780 or more. In one embodiment, the COR is about 0.790 or greater. Furthermore, a solid sphere formed from the composition of the invention has a COR of about 0.65 or greater. In one embodiment, the COR is about 0.75 or greater. In another embodiment, the COR of the inner ball is about 0.76 or greater. In still another embodiment, the COR of the inner ball is about 0.77 or greater. In yet another embodiment, the COR of the inner ball is about 0.79 or greater. For example, the inner ball may have a COR of about 0.800 or greater.

Spin Rate

As known to those of ordinary skill in the art, the spin rate of a golf ball will vary depending on the golf ball construction. In a multilayer ball, e.g., a core, an intermediate layer, and a cover, wherein the cover is formed from the polyurea or polyurethane compositions of the invention, the spin rate of the ball off a driver ("driver spin rate") is substantially higher than balls having covers formed of conventional polyurethane or polyurea compositions. In one embodiment, the driver spin rate is about 3500 rpm or greater. In one embodiment, the driver spin rate is about 4000 rpm or greater. In another embodiment, the driver spin rate is about 5000 rpm or greater. In still another embodiment, the driver spin rate is about 5200 rpm or greater.

In this regard, the spin rate of a golf ball constructed according to the invention off of an 8-iron ("8-iron spin rate") and a half wedge ("half-wedge spin rate") is higher than the spin rate of a golf ball constructed with the same inner components but with a cover formed from a conventional polyurethane or polyurea. For example, in one embodiment, the 8-iron spin rate is about 9000 rpm or greater, preferably about 9500 rpm or greater. In one embodiment, the 8-iron spin rate is about 10000 rpm or greater, preferably about 10500 rpm or greater. For example, the 8-iron spin rate may be from about 11000 rpm to about 13000 rpm. Likewise, the half-wedge spin rate is about 7000 rpm or greater, preferably about 7500 rpm or greater, and more preferably about 8000 rpm or greater.

Two-piece balls made according to the invention may also have driver spin rates of 1500 rpm and greater. In one embodiment, the driver spin rate is about 2000 rpm to about 3300 rpm. Wound balls made according to the invention preferably have similar spin rates.

Methods of determining the spin rate should be well understood by those of ordinary skill in the art. Examples of methods for determining the spin rate are disclosed in U.S. Pat. Nos. 6,500,073, 6,488,591, 6,286,364, and 6,241,622, which are incorporated by reference herein in their entirety.

Flexural Modulus

Accordingly, it is preferable that the golf balls of the present invention have an intermediate layer with a flexural modulus of about 500 psi to about 500,000 psi, measured according to ASTM D-6272-98. More preferably, the flexural modulus of the intermediate layer is about 1,000 psi to about 250,000 psi. Most preferably, the flexural modulus of the intermediate layer is about 2,000 psi to about 200,000 psi. In this aspect of the invention, when the intermediate layer is formed of an ionomeric material, the flexural modulus may be greater than about 10,000 psi.

The flexural modulus of the cover layer is preferably about 40,000 psi or less, and more preferably about 30,000 psi or less. In one embodiment, the flexural modulus of the cover is from about 500 psi to about 35,000 psi. More preferably, the flexural modulus of the cover layer is about 500 psi to about 30,000 psi.

In one embodiment, the compositions of the invention are used in a golf ball with multiple cover layers having essentially the same hardness, but differences in flexural moduli. In this aspect of the invention, the difference between the flexural moduli of the two cover layers is preferably about 5,000 psi or less. In another embodiment, the difference in flexural moduli is about 500 psi or greater. In yet another embodiment, the difference in the flexural moduli between the two cover layers, wherein at least one is reinforced is about 500 psi to about 10,000 psi, preferably from about 500 psi to about 5,000 psi. In one embodiment, the difference in flexural moduli between the two cover layers formed of unreinforced or unmodified materials is about 1,000 psi to about 2,500 psi.

Specific Gravity

The specific gravity of a cover or intermediate layer is preferably at least about 0.7. In one embodiment, the specific gravity of the intermediate layer or cover is about 0.8 or greater, preferably about 0.9 or greater. For example, in one embodiment, the golf ball has an intermediate layer with a specific gravity of about 0.9 or greater and a cover having a specific gravity of about 0.95 or greater. In another embodiment, the intermediate layer or cover has a specific gravity of about 1.00 or greater. In yet another embodiment, the specific gravity of the intermediate layer or cover is about 1.05 or greater, preferably about 1.10 or greater.

The core may have a specific gravity of about 1.00 or greater, preferably 1.05 or greater. For example, a golf ball of the invention may have a core with a specific gravity of about 1.10 or greater and a cover with a specific gravity of about 0.95 or greater.

Shear/Cut Resistance

The cut resistance of a golf ball cover may be determined using a shear test having a scale from 1 to 9 assessing damage and appearance. In one embodiment, the damage rank is preferably about 3 or less, more preferably about 2 or less. In another embodiment, the damage rank is about 1 or less. The appearance rank of a golf ball of the invention is preferably about 3 or less. In one embodiment, the appearance rank is about 2 or less, preferably about 1 or less.

EXAMPLES

The following non-limiting examples are merely illustrative of the preferred embodiments of the present invention, and are not to be construed as limiting the invention, the scope of which is defined by the appended claims. Parts are by weight unless otherwise indicated.

Example 1

Compositions of the Invention

Compositions formed according to the invention are outlined in Table 1 below.

TABLE 1

| | COMPOSITION OF THE INVENTION | | | |
| --- | --- | --- | --- | --- |
| | | Invention | Experimental | Control |
| Prepolymer | Isocyanate-Containing Component | Reaction product of MDI and PTMEG 2000[1] | Desmodur ® N-3400[4] | Reaction product of MDI and PTMEG 2000[1] |

TABLE 1-continued

COMPOSITION OF THE INVENTION

|  |  | Invention | Experimental | Control |
|---|---|---|---|---|
| | Isocyanate-Reactive Component | | Aminoalcohol[5] | |
| | Free NCO | 6.0 | 6.5 | 6.0 |
| Curing Agent | Curing Agent Additive(s) | Poly THF ® 650[2] | Desmophen ® NH 1220[6] 3.5% HCC-19584[3] | Ethacure 300[7] |
| | Ratio of Prepolymer to Curing Agent | 1:0.95 | 1:0.95 | 1:0.95 |
| | Material Hardness (Shore D) | 12 | 14 | 48 |

[1]Reaction product of diphenylmethane diisocyanate and polytetramethylene ether glycol with a molecular weight of 2000.
[2]Poly THF ® 650 is a polyether diol having a molecular weight of 650 from BASF Corporation.
[3]HCC-19584 is a white dispersion manufactured by PolyOne.
[4]Desmodur ® N-3400 is a solvent free low viscosity aliphatic polyisocyanate resin based on hexamethylene diisocyanate from Bayer.
[5]An aminoalcohol of Jeffamine ® D-2000, available from Huntsman, and a caprolactone monomer.
[6]Desmophen ® NH 1220 is a solvent free amine-functional aspartic ester from Bayer.
[7]Ethacure ® 300 is an aromatic diamine (dimethylthiotoluene diamine (DMTDA)) from Albemarle Corporation.

Example 2

Balls Made According to an Embodiment of the Invention

The formulations in Example 1 were used to form covers on an inner ball that includes a polybutadiene core and an ionomer resin casing layer. In particular, ball #1 was made with a cover formed according to the invention, ball #2 was made with a cover formed according to the formulation designated in Example 1 as "experimental," and ball #3 was based on Titleist's Pro V1. All inner components of balls #1, #2, and #3 were identical. The physical characteristics of these balls are shown below in Table 2.

TABLE 2

PHYSICAL CHARACTERISTICS

| Ball | #1 (Invention) | #2 (Experimental) | #3 (Pro V1) |
|---|---|---|---|
| Cover Hardness (Shore D/Shore C) | 49/74 | 50/77 | 59/83 |
| Compression (Atti) | 87 | 85 | 87 |
| COR at 125 ft/s | 0.810 | 0.795 | 0.807 |
| Impact Durability @ 400 hits | 1 @370,375X | 2 @ 388X | No Failures |
| Cold Crack Resistance at 5° F. | | No Failures | |
| Molded Ball Shear Rating | 1 | 2 | 1 |

The cover hardness for the ball #1 is comparable to ball #2 and lower than ball #3. As shown above, a ball with a cover made according to the present invention has comparable compression to a ball made with a conventional polyurethane, e.g., Pro V1, and slightly higher compression than a ball made with a polyurethane formulation having comparable hardness to the composition of the invention. Surprisingly, ball #1 suffered no loss in COR over that of the control ball #3 and actually gained COR over ball #2. In addition, the impact durability and molded ball shear rating of ball #1 is much improved over that of ball #2. In sum, when the formulation of the invention is used as a cover in a three-piece ball, a significant decrease in hardness is achieved without a loss in COR.

As further shown below in Table 3, the driver spin rate, 8-iron spin rate, and half-wedge spin rate of a ball with a cover made according to the present invention are substantially higher than the control ball #3.

TABLE 3

SPIN RATES

| Ball | | #1 (Invention) | #3 (Pro V1) |
|---|---|---|---|
| Std Driver | Launch | 7.6 | 9.2 |
| | Spin | 5237 | 3129 |
| | Speed | 161.7 | 161.1 |
| 8-Iron | Launch | 17.2 | 19.4 |
| | Spin | 11079 | 8195 |
| | Speed | 115.8 | 114.9 |
| Half-Wedge | Launch | 29.7 | 31.0 |
| | Spin | 8136 | 6957 |
| | Speed | 54.0 | 53.4 |

As explained above, the inner ball construction of #1 and #3 are identical. As such, without being bound to any particular theory, the increase in spin is a result of the low material hardness of the composition used form the cover of ball #1.

Example 3

Three-Piece Ball Construction According to the Invention

Three-piece balls were constructed according to the invention including components having formulations and characteristics as set forth in Table 4. The core formulation is based on 100 parts of rubber. The ball has a compression that ranges from 80 to 115 Atti and a coefficient of restitution that ranges from 0.800 to 0.820.

TABLE 4

THREE-PIECE BALL CONSTRUCTION ACCORDING TO THE INVENTION

|  |  | #4 | #5 |
|---|---|---|---|
| CORE | | | |
| Formulation | Shell 1220 | 100 | 100 |
|  | Color Masterbatch | 0.8 | 0.4 |
|  | Perkadox BC | 1.16 | — |
|  | Trigonox 265 | — | 0.55 |
|  | Regrind | 16.0 | 16.0 |
|  | Zinc Diacrylate (ZDA) | 32.1 | 32 |
|  | Polywate | 11.7 | 11.7 |
|  | Zinc Oxide | 4.86 | 4.86 |
|  | Zinc Pentachlorothiophenol (ZnPCTP) | 2.35 | — |
| Properties | Outer Diameter (inches) | colspan=2: 1.520-1.580 | |
|  | Compression (Atti) | colspan=2: 60-90 | |
|  | COR @ 125 ft/s | colspan=2: >0.790 | |
|  | Mooney Viscosity | colspan=2: >30 | |
| INTERMEDIATE LAYER | | | |
| Formulation | Surlyn ® 8940 | colspan=2: 50 | |
|  | Surlyn ® 7940 | colspan=2: 50 | |
| Properties | Flexural Modulus (psi) | colspan=2: >10,000 | |
|  | Hardness (Shore D) | colspan=2: >60 | |
|  | Thickness (inches) | colspan=2: 0.010-0.060 | |
| COVER | | | |
| Properties | Material Hardness (Shore D) | colspan=2: 10-60 | |
|  | Flexural Modulus (psi) | colspan=2: 500-30,000 | |
|  | Thickness (inches) | colspan=2: 0.010-0.080 | |

Example 4

Four-Piece Ball According to the Invention

Four-piece balls were constructed according to the invention including centers and outer core layers having formulations and characteristics as set forth in Tables 5 and 6. The center and outer core layer formulations are based on 100 parts of rubber. Either of core A or B can be used with either of outer core layer C or D in combination with the inner and outer cover layers set forth in Table 7. The specific gravity of the core and outer core layer material is essentially equal. The ball has a compression that ranges from 97 to 105 Atti and a coefficient of restitution that ranges from 0.808 to 0.814.

TABLE 5

CENTER COMPONENT OF FOUR-PIECE BALL

|  |  | A | B |
|---|---|---|---|
| Formulation | CB23 | 64.4 | 64.4 |
|  | Shell 1220 | 35.6 | 35.6 |
|  | Color Masterbatch | 1.5 | 0.19 |
|  | Perkadox BC | 1.0 | 1.0 |
|  | Regrind | 14.7 | 14.7 |
|  | Zinc Diacrylate (ZDA) | 22.2 | 22.2 |
|  | Polywate | 16.7 | 16.7 |
|  | Zinc Oxide | 5.0 | 5.0 |
|  | Zinc Pentachlorothiophenol (ZnPCTP) | 0.52 | — |
| Properties | Diameter (inches) | colspan=2: 1.0-1.5 | |
|  | Compression (SCDI) | colspan=2: >70 | |
|  | Mooney Viscosity | colspan=2: >30 | |

TABLE 6

OUTER CORE COMPONENT OF FOUR-PIECE BALL

|  |  | C | D |
|---|---|---|---|
| Formulation | CB23 | 91.0 | 91.0 |
|  | Kurary | 9.0 | 9.0 |
|  | Color Masterbatch | 0.53 | 0.26 |
|  | Perkadox BC | 1.0 | — |
|  | Trigonox | — | 0.5 |
|  | Regrind | 17.2 | 17.2 |
|  | Zinc Diacrylate (ZDA) | 40 | 40 |
|  | Zinc Oxide | 13.0 | 13.0 |
|  | Zinc Pentachlorothiophenol (ZnPCTP) | 2.35 | — |
| Properties | Outer Diameter (inches) | colspan=2: 1.53-1.62 | |
|  | Compression (SCDI) | colspan=2: >70 | |
|  | COR @ 125 ft/s | colspan=2: >0.800 | |
|  | Mooney Viscosity | colspan=2: >30 | |

TABLE 7

COVER LAYERS FOR FOUR-PIECE BALL

| INNER COVER LAYER | | |
|---|---|---|
| Formulation | Surlyn ® 8940 | 50 |
|  | Surlyn ® 7940 | 50 |
| Properties | Flexural Modulus (psi) | >10,000 |
|  | Hardness (Shore D) | >60 |
|  | Thickness (inches) | 0.010-0.060 |
| OUTER COVER LAYER | | |
| Properties | Material Hardness (Shore D) | 10-60 |
|  | Flexural Modulus (psi) | 500-30,000 |
|  | Thickness (inches) | 0.010-0.080 |

As used herein, the term "about" is used in connection with one or more numbers or numerical ranges, should be understood to refer to all such numbers, including all numbers in a range. Other than in the operating examples, or unless otherwise expressly specified, all of the numerical ranges, amounts, values and percentages such as those for amounts of materials, times and temperatures of reaction, ratios of amounts, values for molecular weight (whether number average molecular weight ("$M_n$") or weight average molecular weight ("$M_w$"), and others in the following portion of the specification may be read as if prefaced by the word "about" even though the term "about" may not expressly appear with the value, amount or range. Accordingly, unless indicated to the contrary, the numerical parameters set forth in the following specification and attached claims are approximations that may vary depending upon the desired properties sought to be obtained by the present disclosure.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

The invention described and claimed herein is not to be limited in scope by the specific embodiments herein disclosed, since these embodiments are intended as illustrations of several aspects of the invention. Any equivalent embodiments are intended to be within the scope of this invention.

For example, the compositions of the invention may also be used in golf equipment such as putter inserts, golf club heads and portions thereof, golf shoe portions, and golf bag portions. Indeed, various modifications of the invention in addition to those shown and described herein will become apparent to those skilled in the art from the foregoing description. Such modifications are also intended to fall within the scope of the appended claims. All patents and patent applications cited in the foregoing text are expressly incorporate herein by reference in their entirety.

What is claimed is:

1. A golf ball comprising:
a core;
an inner cover layer disposed about the core; and
an outer cover layer disposed about the inner cover layer, wherein the outer cover layer has a hardness of about 30 Shore D to about 60 Shore D and is formed from a castable material comprising:
a prepolymer formed from the reaction product of at least one isocyanate and polytetramethylene ether glycol, wherein the NCO content of the prepolymer ranges from about 5 percent to about 7 percent; and
a polyether diol having a molecular weight of about 400 to about 2500 and having the following structure:

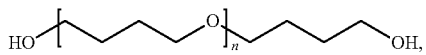

wherein n is the chain length from 2 to 30;
wherein the castable material has a hardness of about 8 Shore D to about 16 Shore D.

2. The golf ball of claim 1, wherein the composition comprises a ratio of prepolymer to polyether diol of about 1:0.95.

3. The golf ball of claim 1, wherein the material hardness is about 10 Shore D to about 14 Shore D.

4. The golf ball of claim 1, wherein the golf ball has a COR of about 0.810 or greater at 125 ft/s.

5. The golf ball of claim 1, wherein the prepolymer has an NCO content of about 6 percent to about 6.5 percent.

6. The golf ball of claim 1, wherein the difference between the flexural moduli of the inner cover layer and outer cover layer is about 5,000 psi or less.

7. The golf ball of claim 1, wherein the polyether diol has a chain length n of about 7 to about 27.

8. The golf ball of claim 1, wherein the polyether diol has a molecular weight of about 650 to about 2000.

9. A golf ball comprising:
a core; and
a cover having a hardness of about 40 Shore D to about 55 Shore D, wherein the cover is formed from a castable material comprising:
a prepolymer formed from the reaction product of at least one isocyanate-containing component and at least one isocyanate-reactive component; and
a polyether diol having a molecular weight of about 400 to about 2500 and having the following structure:

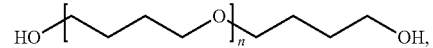

wherein n is the chain length from 2 to 30;
wherein the castable material has a hardness of about 8 Shore D to about 16 Shore D.

10. The golf ball of claim 9, wherein the golf ball has a COR of about 0.810 or greater at 125 ft/s.

11. The golf ball of claim 9, wherein the prepolymer comprises a reaction product of di phenyl methane diisocyanate and polytetramethylene ether glycol.

12. The golf ball of claim 9, wherein the golf ball has an 8-iron spin rate of about 10,000 rpm or greater.

13. The golf ball of claim 9, wherein the castable material comprises a ratio of prepolymer to polyether diol of about 1:0.95.

14. The golf ball of claim 9, wherein the polyether diol has a chain length n of about 7 to about 27.

15. The golf ball of claim 9, wherein the castable material has a hardness of about 8 Shore D to about 14 Shore D.

16. A golf ball comprising:
a core;
a cover; and
an intermediate layer disposed between the core and the cover,
wherein the cover has a hardness of about 40 Shore D to about 55 Shore D and is formed from a castable material comprising:
a prepolymer formed from at least one aromatic diisocyanate and at least one polyol, wherein the NCO content of the prepolymer ranges from about 5 percent to about 7 percent; and
a polyether diol having the following structure:

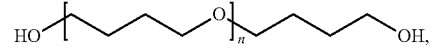

wherein n is the chain length from 2 to 30;
wherein the castable material has a hardness of about 8 Shore D to about 16 Shore D.

17. The golf ball of claim 16, wherein the flexural modulus of the intermediate layer is about 2,000 psi to about 200,000 psi.

18. The golf ball of claim 16, wherein the golf ball has a driver spin rate of about 5,000 rpm or greater.

19. The golf ball of claim 16, wherein the polyether diol has a molecular weight of about 650 to about 2000.

20. The golf ball of claim 16, wherein the polyether diol has a chain length n of about 7 to about 27.

* * * * *